(12) United States Patent
Barak et al.

(10) Patent No.: US 7,620,370 B2
(45) Date of Patent: *Nov. 17, 2009

(54) MOBILE BROADBAND WIRELESS ACCESS POINT NETWORK WITH WIRELESS BACKHAUL

(75) Inventors: Oz Barak, Hod Hasharon (IL); Assaf Touboul, Natanya (IL)

(73) Assignee: DesignArt Networks Ltd, Ra'Anana (IL)

(*) Notice: Subject to any disclaimer, the term of this patent is extended or adjusted under 35 U.S.C. 154(b) by 103 days.

This patent is subject to a terminal disclaimer.

(21) Appl. No.: 11/623,110

(22) Filed: Jan. 15, 2007

(65) Prior Publication Data

US 2008/0090575 A1    Apr. 17, 2008

Related U.S. Application Data

(60) Provisional application No. 60/830,727, filed on Jul. 13, 2006, provisional application No. 60/843,183, filed on Sep. 8, 2006, provisional application No. 60/843,079, filed on Sep. 8, 2006.

(51) Int. Cl.
*H04B 7/00* (2006.01)
*H04B 15/00* (2006.01)

(52) U.S. Cl. ............... 455/67.13; 455/452.1; 455/507; 370/480

(58) Field of Classification Search ............. 455/507, 455/67.13, 452.1; 370/338, 480
See application file for complete search history.

(56) References Cited

U.S. PATENT DOCUMENTS

| | | | |
|---|---|---|---|
| 7,366,202 B2 * | 4/2008 | Scherzer et al. | 370/480 |
| 2005/0122999 A1 * | 6/2005 | Scherzer et al. | 370/480 |
| 2006/0229090 A1 * | 10/2006 | LaDue | 455/507 |
| 2008/0014955 A1 * | 1/2008 | Shannon et al. | 455/452.1 |
| 2008/0107092 A1 * | 5/2008 | Taaghol et al. | 370/338 |
| 2008/0227401 A1 * | 9/2008 | Scherzer et al. | 455/67.13 |

* cited by examiner

*Primary Examiner*—William D Cumming
(74) *Attorney, Agent, or Firm*—Deborah Gador

(57) ABSTRACT

A WiMAX network and communication method, the network including a plurality of WiMAX nodes deployed in micro or pico cells for providing access service to a plurality of mobile subscribers, a plurality of these nodes being arranged in a cluster, one of the nodes in each cluster being a feeder node coupled to a core network, the nodes in each cluster being coupled for multi-hop transmission to the feeder node. According to a preferred embodiment, each node includes a transceiver with associated modem, an antenna arrangement coupled to the modem and arranged for multiple concurrent transmissions, and a MAC controller for controlling the transceiver, modem and antenna arrangement for providing both access and backhaul communication.

81 Claims, 28 Drawing Sheets

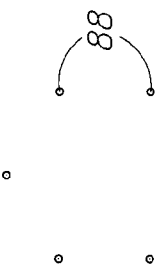
TYPE II
FIG.5D
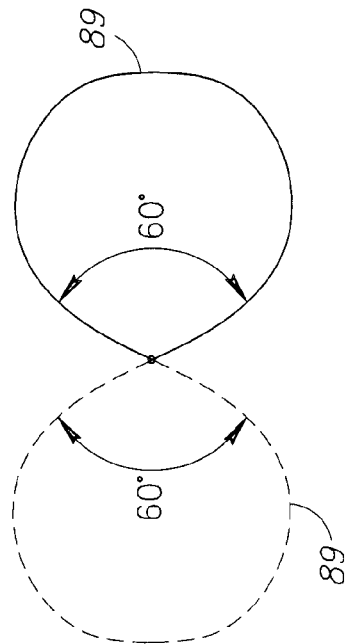
FIG.5E
TYPE I
FIG.5A
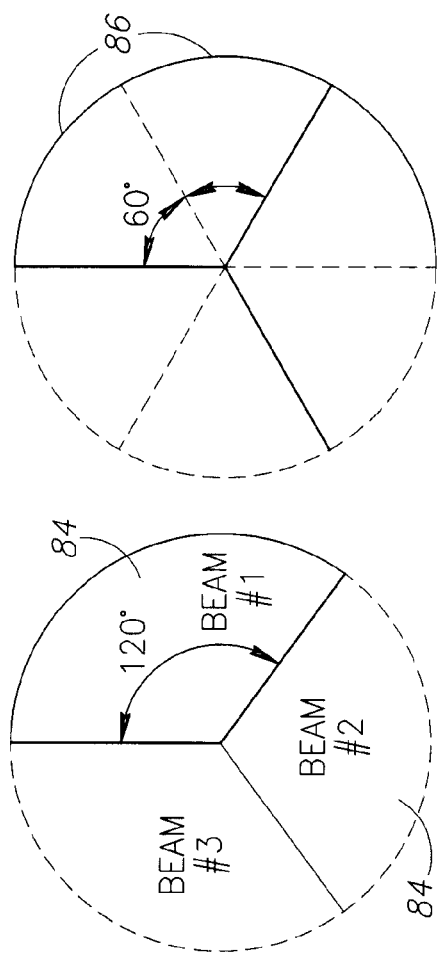
FIG.5C
FIG.5B

T1: A → B1, B5 → B4

T2: A → B3, B1 → B6

T3: A → B5, B3 → B2

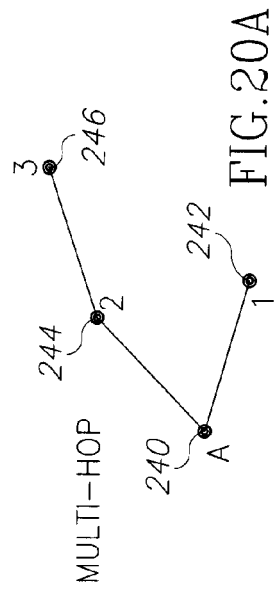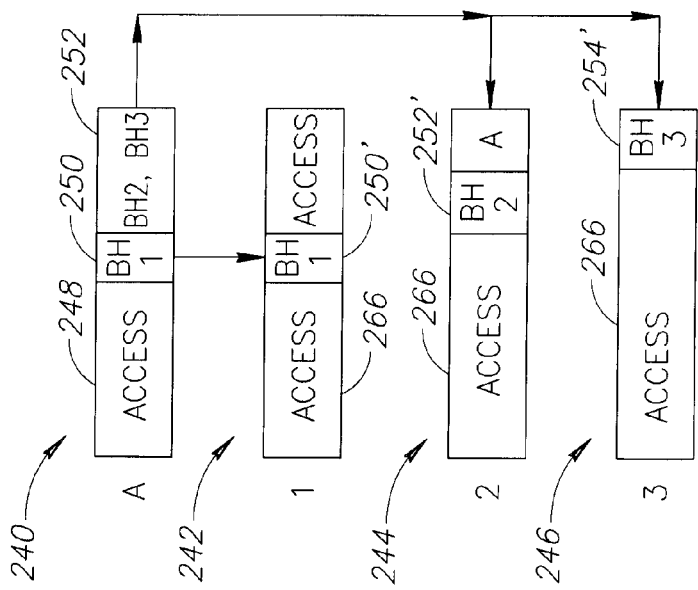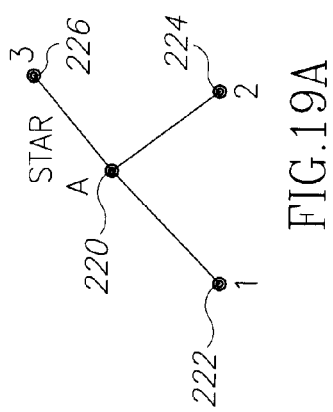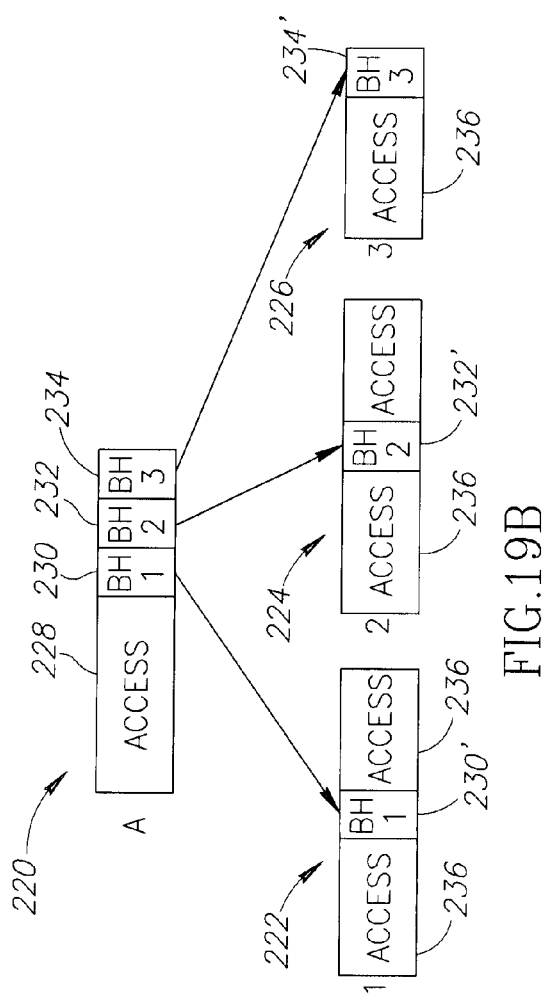

MOBILE BROADBAND WIRELESS ACCESS POINT NETWORK WITH WIRELESS BACKHAUL

This application claims the benefit of Provisional Application Nos. 60/830,727 filed Jul. 13, 2006, No. 60/843,183 filed Sep. 8, 2006, and No. 60/843,079 filed Sep. 8, 2006.

FIELD OF THE INVENTION

The present invention relates to communications networks, in general and, in particular, to WiMAX communication systems.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base stations), while a backhaul network is the air interface network providing traffic communication between the various base stations and a core network. The networks may be arranged to transfer data alone, as in Wi-Fi networks, or may be arranged for triple play services (video, audio and data), typically WiMAX (or other competitive technology, such as 3GPP-LTE). In conventional systems, the access network and the backhaul network each require their own separate transmission equipment, antennas, etc, at great cost to the operator.

One example of a conventional backhaul network is connecting wireless base stations to corresponding core mobile networks (ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

In traditional Point-to-Point (PTP) microwave backhaul operating in licensed bands or using unlicensed bands, OFDM (Orthogonal Frequency Division Multiplexing) or single carrier technology (constant power with a fixed modulation scheme) are typically employed. In OFDM, the channel bandwidth is divided into multiple concurrent parallel transmissions on several frequencies. However, during each time slot, there must be transmission over every frequency in the bandwidth. Thus, there is no granulation to permit correction of local interference, and, if there is a problem with transmission on one frequency, the entire transmission can be lost due to lack of frequency diversity, so the Signal to Noise Ratio (SNR) of a link (between two base stations) falls on the entire link.

Mobile WiMAX, as defined in IEEE Standard 802.16e-2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.). A complete mobile WiMAX Radio Access Network (RAN) requires deployment of massive infrastructure, including base station sites with high towers, base station equipment, antennas, and a separate backhaul network, as described above.

The traditional approach for mobile WiMAX network infrastructure deployment is similar to that of cellular phone networks. The network is based on macro-cell deployment, that is, the base stations, radios and antennas are installed on top of high towers, transmitting at high power, so as to maximize the base station coverage area. In order to optimize the cost, the goal is to minimize the number of sites. This can be achieved by deploying more powerful base station equipment for increasing the cell range (e.g., high power radios, multiple radios on each sector with smart antenna techniques), resulting in more expensive base station equipment. However, for a broadband wireless network deployment, this approach is adequate mainly for the coverage phase, when a relatively small number of subscribers share the cell capacity. As the cell coverage area is large, covering a large number of potential subscribers, additional subscribers in each area can rapidly be blocked due to limited base-station capacity.

There are also known outdoor Wi-Fi networks, deployed mainly according to outdoor Wi-Fi mesh technology. The typical Wi-Fi setup contains one or more Access Points (APs) (which is the equivalent terminology to Base Station in WiMax), having relatively limited range, deployed along telephone poles, street poles, electricity poles and rooftops. Due to the access point unit's smaller coverage range, a large number of access point units are required to cover a given area, typically between 20 to 30 access points per square mile, with wired backhaul at each 3 or 4 hops (known as micro or pico cell deployment). Conventional outdoor Wi-Fi access point units require costly power amplifiers in each unit to extend the capacity in the downlink, but are still limited by link budget in the uplink, due to limited transmission power from mobile station units (such as a laptop, which typically transmits about 20 dbm on a single small integrated antenna) and due to the fact that Wi-Fi utilizes OFDM, where there is no spectral sub-channelization in uplink, which would enable enhancing the link budget. In addition, conventional Wi-Fi networks operate only on unlicensed bands, typically 2.4 GigaHz or 5 GigaHz bands, and suffer from severe interference and difficult radio-planning issues.

Furthermore, in the micro/pico-cell deployment approach of conventional Wi-Fi mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive, due to costly equipment and installation costs. Furthermore, it is not feasible to deploy conventional Wi-Fi backhaul units on telephone poles, street poles, electricity poles, etc., due to the physical dimensions of the backhaul unit and lack of line of sight in urban below-rooftop deployment. In addition, when the network traffic load is increased in multi hop deployment, traffic capacity losses in the backhaul network drastically degrade the overall network performance (capacity and latency), due to incremental loading of cascaded access points in a certain route to the physical line backhaul.

Consequently, there is a long felt need for a wireless mobile broadband network that is relatively low in cost of initial infrastructure (coverage deployment), and also provides high capacity for supporting a large number of broadband data subscribers without high initial deployment cost. In addition, it would be desirable for such a network to support low cost planning, installation and equipment deployment, and to permit relatively easy addition of new access points to the network.

SUMMARY OF THE INVENTION

The present invention relates to a wireless broadband communication network, herein illustrated by way of example only as a WiMAX® network, including a plurality of low cost, high capacity access point units deployed in micro or pico cells. Each access point unit provides service to a plurality of mobile subscribers, and communicates with one or more other access point units, preferably, over an in-band, point to point backhaul network. The access point units are arranged in clusters, and coupled for multi-hop transmission. One access point in each cluster is designated as a feeder node and is coupled to the core network for providing backhaul to the core for the entire cluster, as well as coordination of the other access points in the cluster.

The present invention adds an additional layer of communication to conventional networks. In particular, in addition to a high capacity access network, the WiMAX network of the invention incorporates also a point to point communication system providing a broadband wireless backhaul interconnection between access point nodes in the network. Thus, various nodes can communicate with one another, and not only with mobile subscribers or the core network, as in conventional networks. Each node can be an access point, a base station, a relay station, or any other infrastructure element which supports wireless infrastructure to infrastructure communication. Each node preferably includes a single controller (typically a MAC controller) for controlling and coordinating both access and backhaul communications in the node. A conventional backhaul network, preferably a wired network, may be utilized to provide backhaul between the core network and each feeder node, which manages the cluster and distributes the traffic between the various nodes within the cluster.

Each node's hardware preferably includes a plurality of radio transceivers with associated modems which are controlled by the MAC controller. According to a preferred embodiment, the method and system of the invention involve the use of multiple omni-directional antennas in each access point, one coupled to each modem. Each node has two modes of operation—access communication to mobile stations and backhaul communication between access points and towards the core. In access, using omni antennas, each node can provide up to 3 sectors for concurrent transmission. The MAC controller physically manages the node, although, logically, each antenna group or each sector is driven by a different MAC instance, which manages the modem and radios associated with that group. According to various embodiments, there can be concurrent transmission over 2, 3 or 6 antennas in a specific geographic sector of, say 120° using beam forming techniques. This simulates a low cost directional antenna with high link budget, to reach up to 400 meter cell coverage. Furthermore, omni antennas permit multiple concurrent transmissions over multiple antennas in backhaul, for example, MIMO (Multiple In Multiple Out) for point-to-point transmissions over a single link, and SDMA (Spatial Division Multiple Access) for point to multi-point transmissions over several spatially separated links between an access point and its associated mobile stations (subscribers).

There is provided according to the present invention a WiMAX network including a plurality of WiMAX nodes deployed in micro or pico cells for providing access service to a plurality of mobile subscribers; a plurality of these nodes being arranged in a cluster; one of the nodes in each cluster being a feeder node coupled to a core network; the nodes in each cluster being coupled for multi-hop transmission to the feeder node.

According to one preferred embodiment of the invention, each node includes a housing; a plurality of omni-directional antennas mounted on the housing; a plurality of transceivers mounted in the housing, each transceiver having an associated modem and being coupled to one of the antennas; and a chip including a MAC processor which directs and coordinates operation of all other elements in the node; a packet processor coupled to an inlet of the MAC processor for providing packets to the modem with air interface attributes; a routing table in the MAC processor for routing packets passing therethrough; a burst modulator coupled to the MAC processor for producing symbol busts for each sector over which that node is transmitting from a plurality of packets having at least some common air interface attributes; a symbol builder coupled to the burst modulator for receiving the symbol bursts and building an OFDM symbol according to a number of streams, sectors and antenna technique for transmitting each burst, and mapping each burst's symbols to frequency and time slots into an OFDMA time/frequency map; a MIMO processing and beam forming module coupled to the symbol builder for receiving the OFDMA symbols and processing signal related to multiple input-multiple output communication; a transmitter front-end module coupled to the MIMO processing and beam forming module for transmitting the OFDMA signals via a transceiver and associated antenna arrangement.

There is also provided, according to the invention, a method of WiMAX communication including deploying a plurality of WiMAX nodes in micro or pico cells for providing access service to a plurality of mobile subscribers, arranging a plurality of these nodes in a cluster, coupling one of the nodes in each cluster to a core network to serve as a feeder node, and coupling the other nodes in each cluster for multi-hop transmission to the feeder node.

BRIEF DESCRIPTION OF THE DRAWINGS

The present invention will be further understood and appreciated from the following detailed description taken in conjunction with the drawings in which:

FIG. 3a is a plan view illustration of a wireless access point unit, according to one embodiment of the invention;

FIG. 3b is a schematic sectional view of the elements of the access point unit of FIG. 3a;

FIG. 5a is a schematic illustration of an antenna configuration according to one embodiment of the invention;

FIGS. 5b and 5c illustrate two embodiments of sectorization by the antenna configuration of FIG. 5a;

FIG. 5d is a schematic illustration of an antenna configuration according to an alternative embodiment of the invention;

FIG. 5e illustrates an embodiment of sectorization by the antenna configuration of FIG. 5d;

FIG. 11b is a schematic illustration of a deployment of nodes in a cluster using the fractional frequency re-use scheme of FIG. 11a;

FIG. 13c is a schematic illustration of transmission frame according to the SDMA configuration of FIG. 13a;

FIG. 14b is a schematic illustration of the spatial interference mitigation scheme according to FIG. 14a;

FIGS. 15a, 15b and 15c are schematic illustrations of transmissions at different times on the spatial interference mitigation scheme of FIG. 14a;

FIGS. 19a and 19b are schematic illustrations of backhaul and access coordination in a cluster in a star configuration deployment, according to one embodiment of the invention;

FIGS. 20a and 20b are schematic illustrations of backhaul and access coordination in a cluster in a multi-hop configuration deployment, according to one embodiment of the invention;

FIG. 21b is a graphical illustration of transmitter power, according to the embodiment of FIG. 21a;

DETAILED DESCRIPTION OF THE INVENTION

Solution Overview

The present invention relates to a next-generation mobile broadband wireless network, particularly a wireless WiMAX network, having a plurality of access point nodes also serving as an internal backhaul network between the various nodes, i.e., base stations, relay stations, access points, etc. For purposes of the present application, all the access and backhauling descriptions refer to any of these possibilities of infrastructure devices. In the discussion that follows, an access network is the air interface network providing communications between access points (base or relay stations) and mobile terminals, defined by IEEE802.16e-2005 standardization (WiMAX), and a backhaul network is the air interface network providing broadband wireless interconnection between access points within the network.

According to one preferred embodiment of the invention, each node has a single controller for controlling and coordinating access and backhaul communication. Preferably, equipment for both access communication and point to point (PTP) backhaul communication is built-in in a single module. Thus, no additional, external equipment is required for backhaul communication between access points, resulting in a "zero-cost" interconnection. The PTP communication operates over the same spectrum allocation (same frequency channel) that is used for access to the wireless subscriber terminals ("in-band" backhauling). This capability is particularly useful for deployments in licensed frequency bands, where the availability of extra spectrum for backhauling might impact the cost of deployment. With this solution, no additional separate frequency slice is required for the backhaul network, saving the costs of additional spectrum fees and frequency planning.

Figure 1:
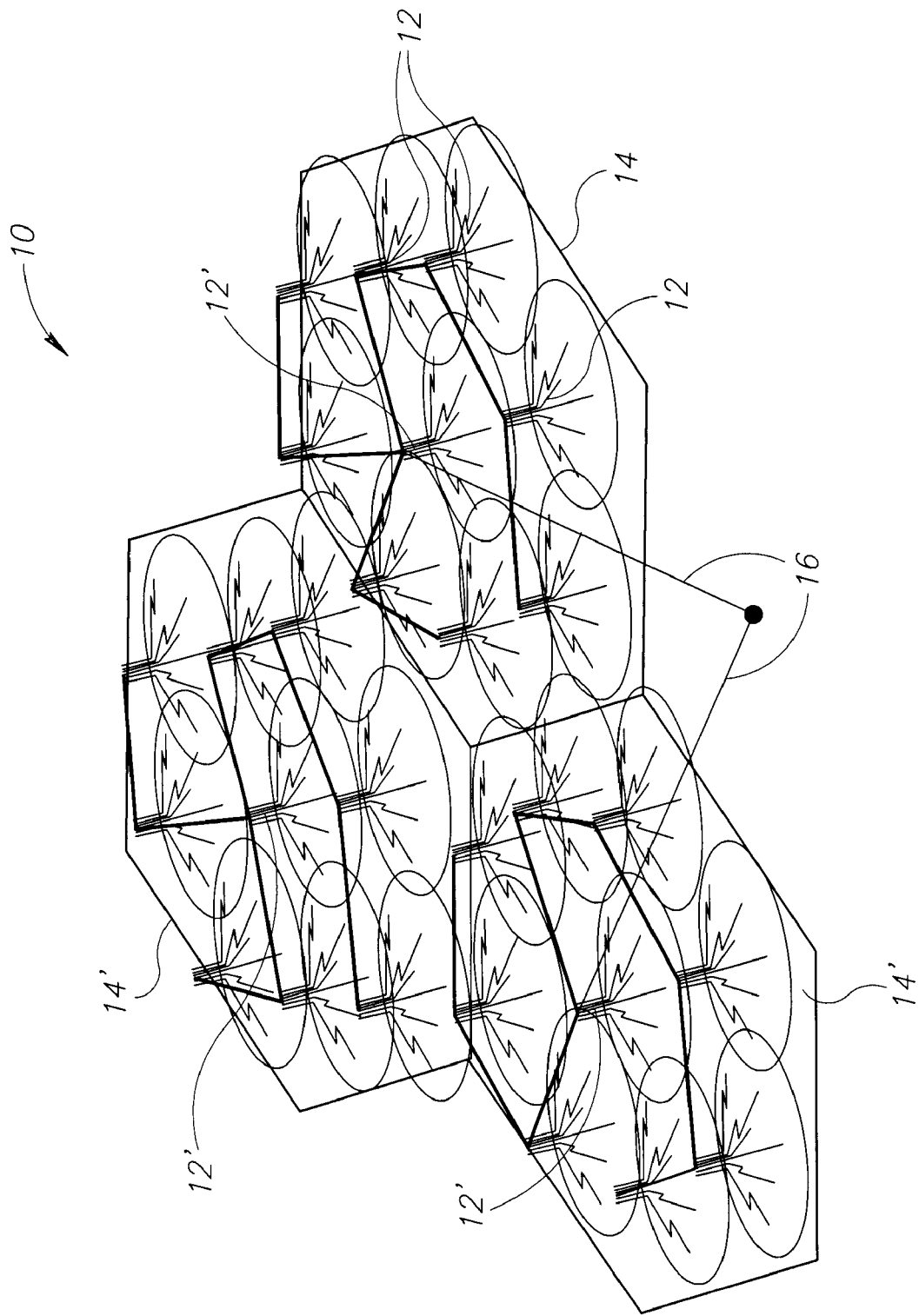
FIG. 1 is a schematic illustration of a wireless network constructed and operative in accordance with one embodiment of the present invention.

Referring to FIG. 1, there is shown one example of a WiMAX network 10 according to the present invention. The network 10 includes a plurality of access point units 12, each of which acts as a base station for its cell. For purposes of the present application, the term access point unit refers also to base stations and to relay stations. Deployment coverage is provided by a network of base stations, which is logically divided to multiple clusters 14, 14' (defined as a logically connected group of base stations). Each cluster 14 is formed of a group of access point nodes 12 wirelessly interconnected to each other (as shown in heavy black lines), each of which provides wireless access to part of the cluster. In each cluster, one access point coordinates all the access points within the cluster and manages the backhaul network interference-mitigation scheme. This access point is referred to as a feeder node 12'. The feeder nodes 12' in each cluster are physically connected to the wired backhaul 16 and serve as the backhaul connection point of the whole cluster 14 to the core network (not shown). Each node 12 provides access to wireless subscribers in its cell coverage area and communicates with at least one other node in the cluster, via the point-to-point communication of the invention, as described below. This communication can either be directly with the feeder node or via another node acting as a relay, to transfer its aggregated traffic towards the core network.

The WiMAX network of the present invention has increased capacity with low cost infrastructure that provides both access and backhaul with high spectral efficiency, while reducing the effects of interference between links. This is accomplished by means of a low cost access point unit having a built-in backhauling mechanism connecting the access points to one another for relaying their aggregated traffic to the core network. The network utilizes a high capacity point-to-point communication system between the access points, serving as the internal backhaul network between the various nodes in the network, i.e., base stations, relay stations, access points, etc.

The high capacity in the PTP link is achieved via methods of increasing the link spectral efficiency (transmitted bits/sec/Hz), although this compromises the link budget (maximum path loss with received transmission). Preferably, this is accomplished by performing high density modulation (QPSK to 256 QAM, at present) and providing multiple concurrent transmissions over multiple antennas. According to one embodiment, multiple transmissions are provided by creating virtual groups of omni-directional antennas, each group creating a beam at a certain beam width and transmitting a single stream. In this way, the spectral efficiency can be increased using MIMO (Multiple In/Multiple Out) antenna techniques (adaptively allocating 1, 2 or 3 MIMO streams to different antennas) resulting in a PTP link with much higher spectral efficiency as compared to the average access network spectral efficiency, and the link budget can be improved by using beam forming with the omni-directional antennas.

The access point units 12 of FIG. 1 are deployed in micro-cell/pico-cell deployment configuration. Micro/pico cells are defined as relatively small cells (typically 300-400 m radius in dense urban areas, as an example) installed in outdoor sites, typically on street lamp posts, telephone or electric poles, and rooftops, etc., as known in conventional outdoor Wi-Fi networks, as well as indoor sites, for in-building coverage extension and extra capacity requirements in indoor locations. Deployment topology of the access point units is preferably using a multi-hop relay topology, rather than macro-cell or mesh technology. This means that each mobile station is coupled to a core mobile network just by the feeder node, or by one or more relay nodes for data relay. Since each access point unit 12 includes built-in, Point to Point backhaul, only a single box need be installed in each location, which results in easy and low cost site preparation (no need for preparing conventional wired backhaul from the core to each node, but only to one node in each cluster (the feeder)) and a low-cost installation (single unit installation). In one embodiment of the invention, for indoor coverage deployment, the unit can be equipped with fewer antennas, such as 2 or 3 antennas, very similar to conventional Wi-Fi MIMO indoor units.

Figure 2A:
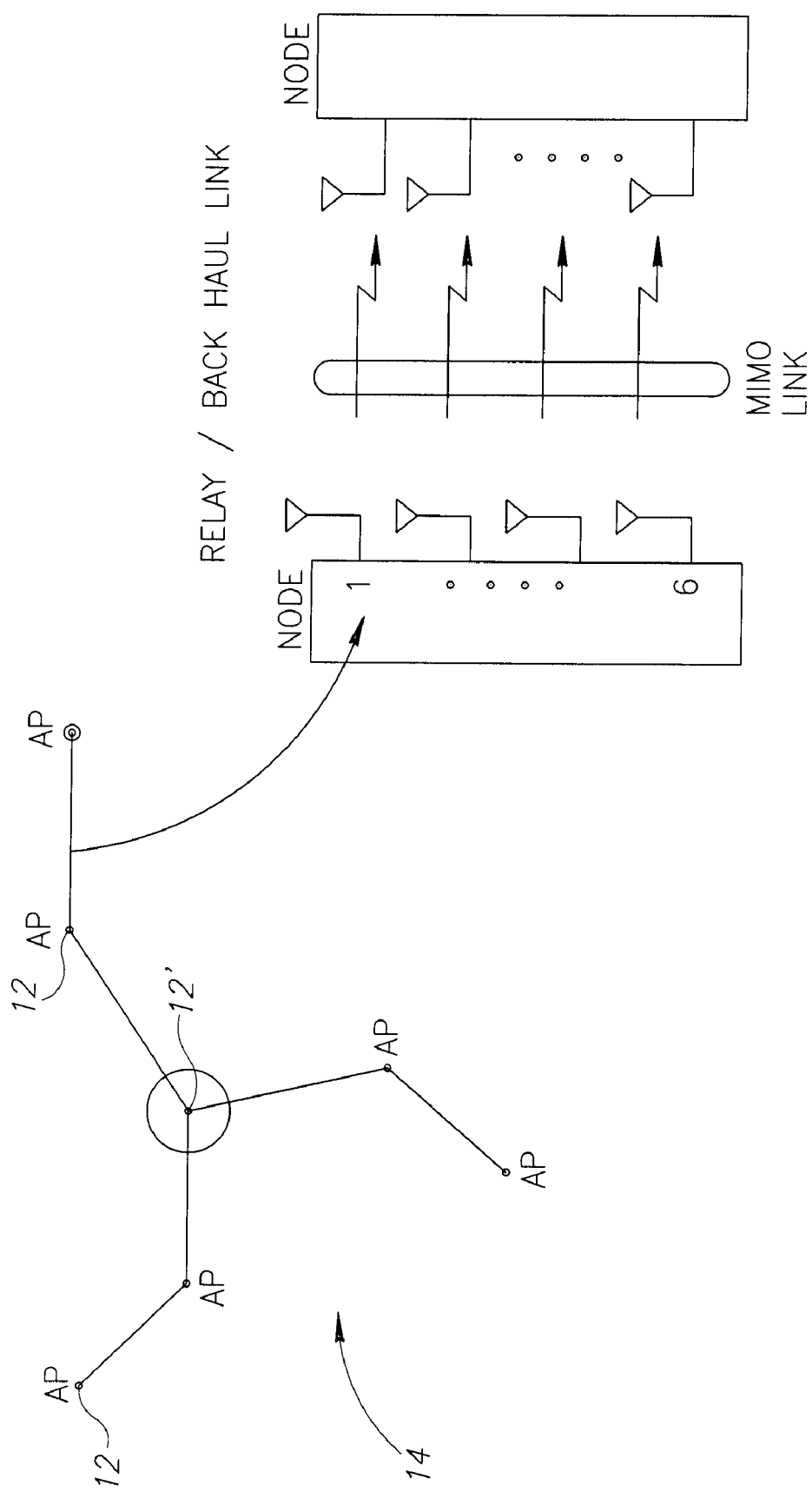
FIG. 2a is a schematic illustration of a deployment topology according to one embodiment of the invention, transmitting over a MIMO link.
Figure 2B:
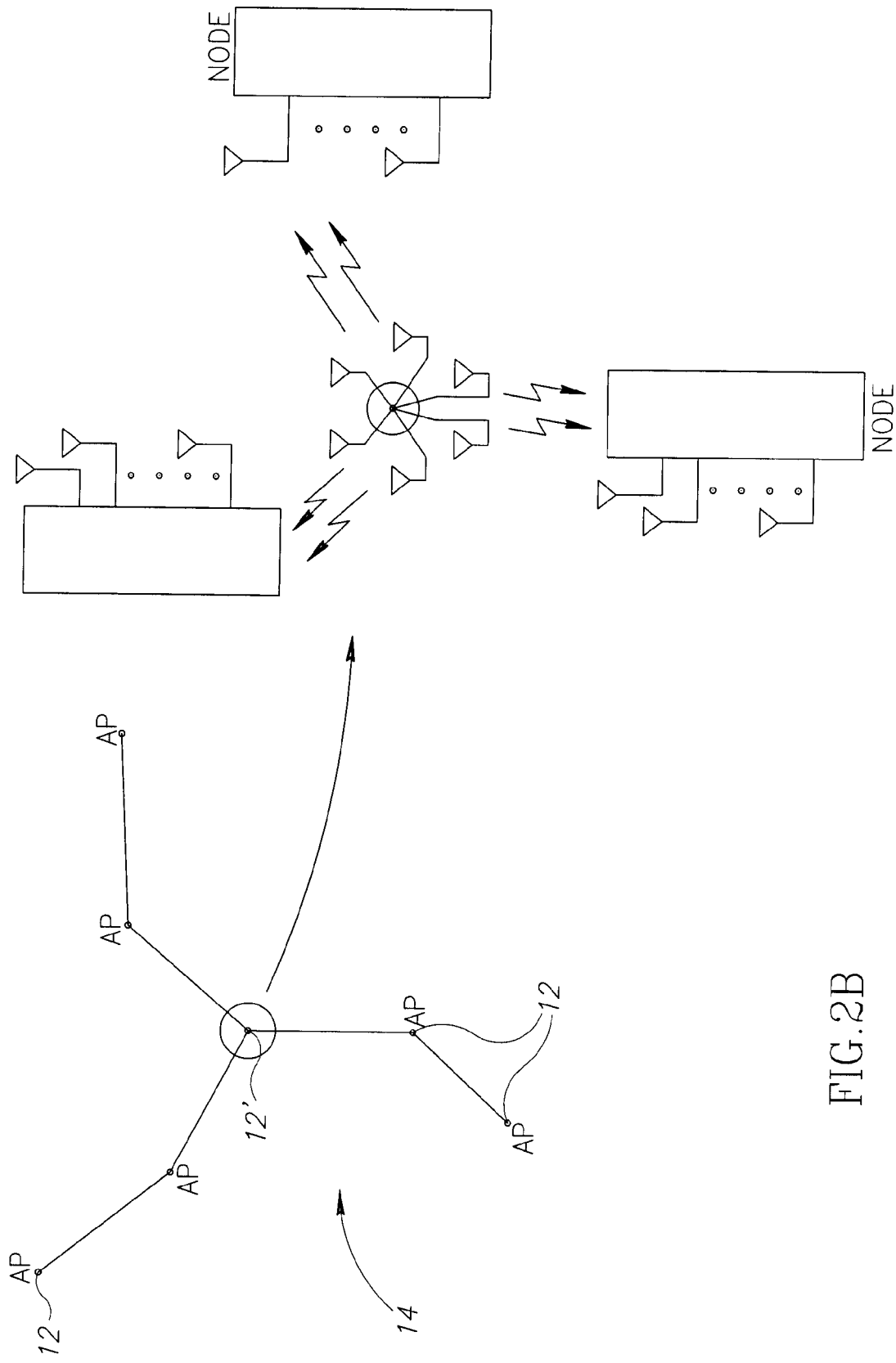
FIG. 2b is a schematic illustration of a deployment topology according to an alternative embodiment of the invention, transmitting over an SDMA link.

The nodes in the cluster 14 of FIG. 1, in one embodiment, may be interconnected in a tree topology, the feeder node being the root of that tree, as illustrated schematically in FIG. 2a. In the present WiMAX network, the topology is preferably star, multi-hop or any combination of these two topologies. All traffic from all nodes 12 in the cluster is routed to and from the feeder node 12', and then to the wired Internet network. The path from each node communicating with the feeder node is known and static under given link and network conditions. Alternatively, routing can also adapt itself due to traffic load sharing between nodes, interference conditions, and other deployment issues. Alternatively, as shown in FIG. 2b, one access point can communicate concurrently with multiple mobile stations in the same frequency band using SDMA (Space Division Multiple Access) techniques. Here, the transmissions are separated by different beam allocations, which are spatially separated due to geographic separation in deployment.

It is important to note that SDMA requires multiple antennas on the feeder node and, theoretically, only one antenna on the other nodes. However, multiple antennas on the non-feeder nodes will increase the link budget between nodes and, thus, improve the robustness of the deployment.

A distributed Pico-cell deployment provides much higher capacity per area compared to a Macro-cell deployment, due to the fact that multiple cells are deployed over the same physical area. About 8 Pico-cell nodes are required to cover the same geographical area as a single Macro-cell, that is, the total capacity over the area is up to 8 times higher. Even taking into account about 30% to 50% capacity loss due to the 'backhaul network' overhead, the total network capacity over the area is about 4-5 times higher than with Macro-cell deployment.

Features of the present network are seamless backhaul and legacy 802.16e WiMAX integration, backhaul completely transparent to mobile stations, centralized managed access to mobile stations manifest by broadcast frame control and MAP bursts, and WiMAX access and backhaul bursts scheduled in the same frame (i.e., each WiMAX frame incorporates both access and backhaul data bursts). The access point coordinates the mobile station access via WiMAX air bursts to the different mobile stations according to control bursts defined as MAP. In addition, the backhaul bursts will be allocated in pre-defined time slots for backhauling, as explained in detail below. It will be appreciated that the present network has standard compliancy in the air interface between mobile stations and the access points. In addition, it will support base station to base station communication on the same frequency channel and bandwidth during different periods within the frame, managed by the MAC controller. All backhauling processes are completely transparent to the WiMax air interface, as defined by IEEE 802.16e.

According to one embodiment of the invention, described in detail below, each access point unit has self-planning capabilities, which include self-installation and self-interconnection in the network. Self-planning access points enable a new node joining the network to automatically configure its own RF parameters, both in terms of bandwidth and transmission parameters, such as antenna beam pattern width, antenna polarization selection, antenna beam direction, beam transmit power and MIMO data streams allocated to it, and in terms of route.

This self-planning capability provides significant benefits to the operator, as it saves frequency-planning costs (new planning for additional nodes in the network), eases the installation and decreases its costs, and enables a quick and inexpensive way to increase the network capacity by adding additional access points without requiring high installation costs. In addition, self-planning allows easy deployment of mobile broadband wireless communication infrastructure, such as WiMAX® infrastructure by a technician skilled in the art, and no specialist in telecommunication networks is required.

Single Entity Solution

A particular feature of the node hardware of a preferred embodiment of the present invention is that the access and backhaul can be managed by a single Radio-PHY-MAC unit, utilizing the same resources (same hardware, same spectrum or frequency bank, and MAC functionalities) for both access and backhaul, and manipulating both traffic types on a frame by frame basis. A single scheduler (software algorithm) manages the traffic allocation to both the access point and PTP link portions of the frames, allocating traffic on each frame to each mobile station or backhaul node in accordance with a set of operator configurations for Quality of Service (QoS), which enables tight control of packet delay, packet delay jitter and packet rates for both backhaul and access.

In general, each node in the network includes a WiMAX RF transceiver (including an RF transmitter and an RF receiver), a power amplifier for the relevant frequency band and power class, an RF filter bank switch to select the band of interest, a low noise reference frequency source and low noise amplifier, an RF filter to meet noise/spur standard requirements, and a transmit/receive switch with a suitable reference clock, as known. Preferably, the transmitter and receiver are designed in Direct Conversion (zero IF transceiver) architecture, with direct up conversion/down conversion directly from the baseband signal to the RF signal, using a single active mixer.

Figures 3A, 3B:
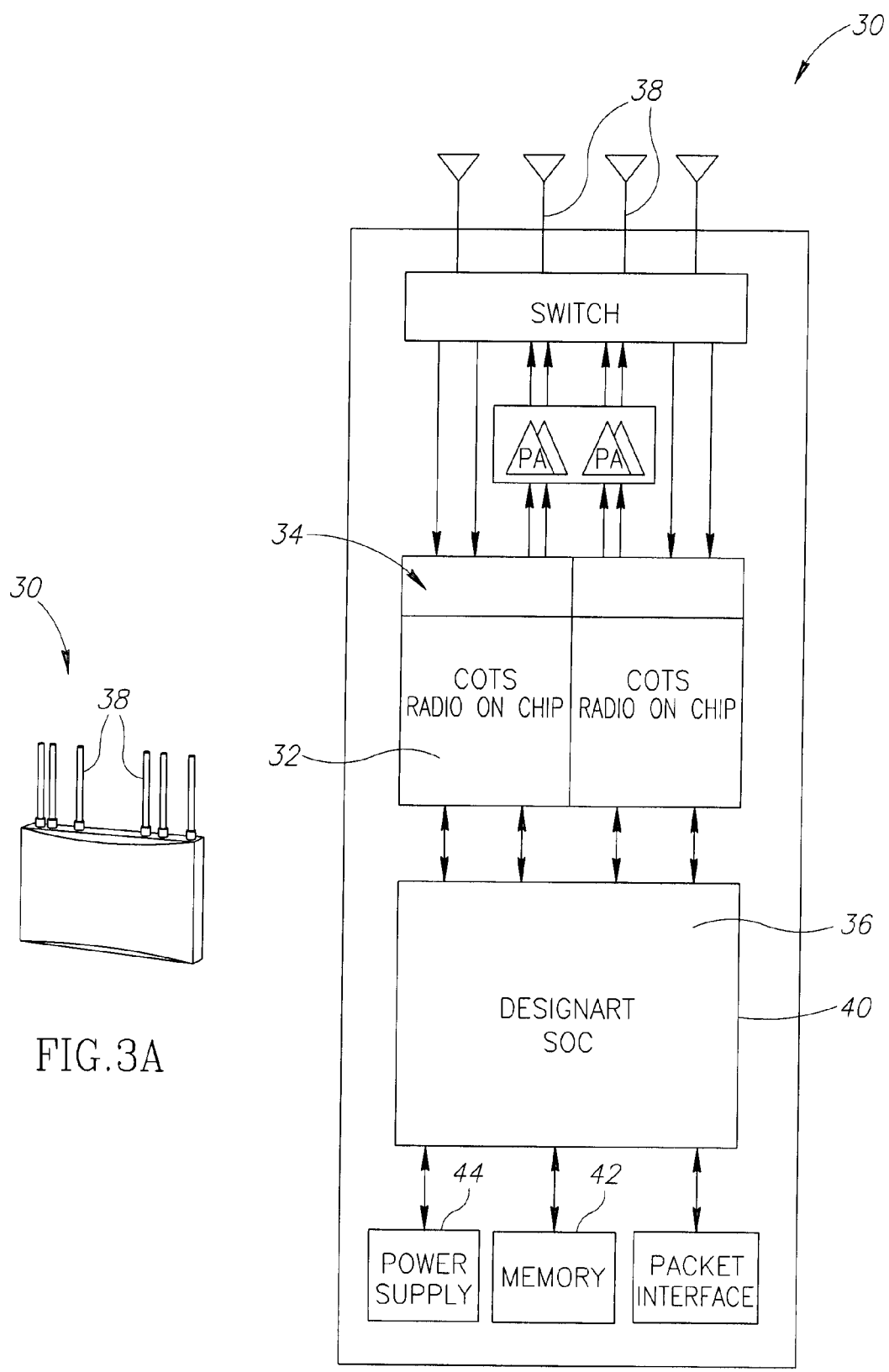

Referring now to FIGS. 3a and 3b, there are shown respective plan view and sectional illustrations of a wireless next-generation mobile broadband node 30, according to one embodiment of the invention, serving as an access point unit or base station (or relay station). Each node 30 includes at least one and, preferably, a plurality of RF transceivers 32 for access to mobile stations within its coverage range, as well as for the high capacity backhaul point-to-point (PTP) link for communication with other nodes in the network.

Each RF transceiver 32 is coupled to an antenna 38. Preferably, antennas 38 are omni-directional antennas, although alternatively, they can be directional antennas. A suitable modem 34 is provided between each RF transceiver 32 and its associated antenna 38. Both access and backhaul are coordinated and synchronized by a single controller 36, here shown as a MAC controller, coupled to the transceivers via the modems, permitting utilization of the same hardware resources of the node, that is, the same radio, modem and antenna elements, for both access and backhaul.

It is a particular feature of the invention that each node or access point unit is based on low-cost, standard off-the-shelf radio transceivers with power amplifiers ("terminal RF-IC" modules), such as those used at present in mobile consumer terminals. According to a preferred embodiment, each node also includes a plurality of low-cost standard omni-directional antennas 38, preferably arranged in groups of 6, 9 or 12 antennas. Using these modules drastically reduces the access point unit cost. Therefore, the access point unit is a low-cost, low-power and small-form-factor unit.

The low cost RF transceivers may be those typically utilized in WiMAX mobile station handset units, which are designed, architecturally, to transmit low power. Thus, the radio is typically zero IF architecture, which requires compensation of I/Q phase misbalancing, gain misbalancing and DC offset. As known, this type of transmission introduces distortion, I/Q DC offset/gain and phase imbalance, which must be treated in the modem (as by pre-compensation) and post-compensation (in the receiver). In one embodiment of the present invention, this is accomplished in a transceiver front end module, described below.

Therefore, working with "low-end" radio transceivers in a next-generation mobile broadband wireless base station requires a unique modem (PHY) design to compensate for the radio limitations, to comply with the standard requirements for base stations, and to enable high capacity point to point broadband employing high modulation, such as 64, 128 or 256 linear QAM modulation. In addition, phase noise should be filtered out in the receiver by a phase loop developed in the base band modem part, to increase the link immunity to the phase noise inherent in low cost radio transceivers. Furthermore, a large dynamic range is required to support concurrent near and far user transmissions in the base station uplink mode of operation, which is not a typical requirement of a receiver operating in mobile station mode. This is desirable since closer transmissions will be stronger than far transmissions, but all transmissions should be concurrently decoded without any power control incorporated within the receiver. This dynamic range requirement can be improved by using a large bit analog to digital (A/D) converter and/or by increasing the sampling frequency, which decreases quantization noise by decimating the signal and filtering it.

In addition, due to the problem of high transmission of out-of-band noise inherent in the low cost direct conversion radio existing in the mobile station unit, transmission power preferably is limited to the low power utilized in the mobile station. (Beam forming techniques can be used later to improve coverage or link budget by enhancing the power transmitted by the unit).

According to a preferred embodiment of the invention, a System-On-Chip (SoC) 40 functions as the main building block of node 30. The full network solution can be integrated into the SoC, enabling standard mobile access services, with a backhauling network connecting the access points to the network backbone. A memory 42 is provided for storing the various algorithms for operation of the node, as well as a power supply 44 to supply the low power (about 7 W, at present) required by the node components. Node 30 acts as a standard Mobile WiMAX 802.16e base station for access to WiMAX subscribers within its coverage range, as well as for the wireless backhaul link.

Figure 4A:
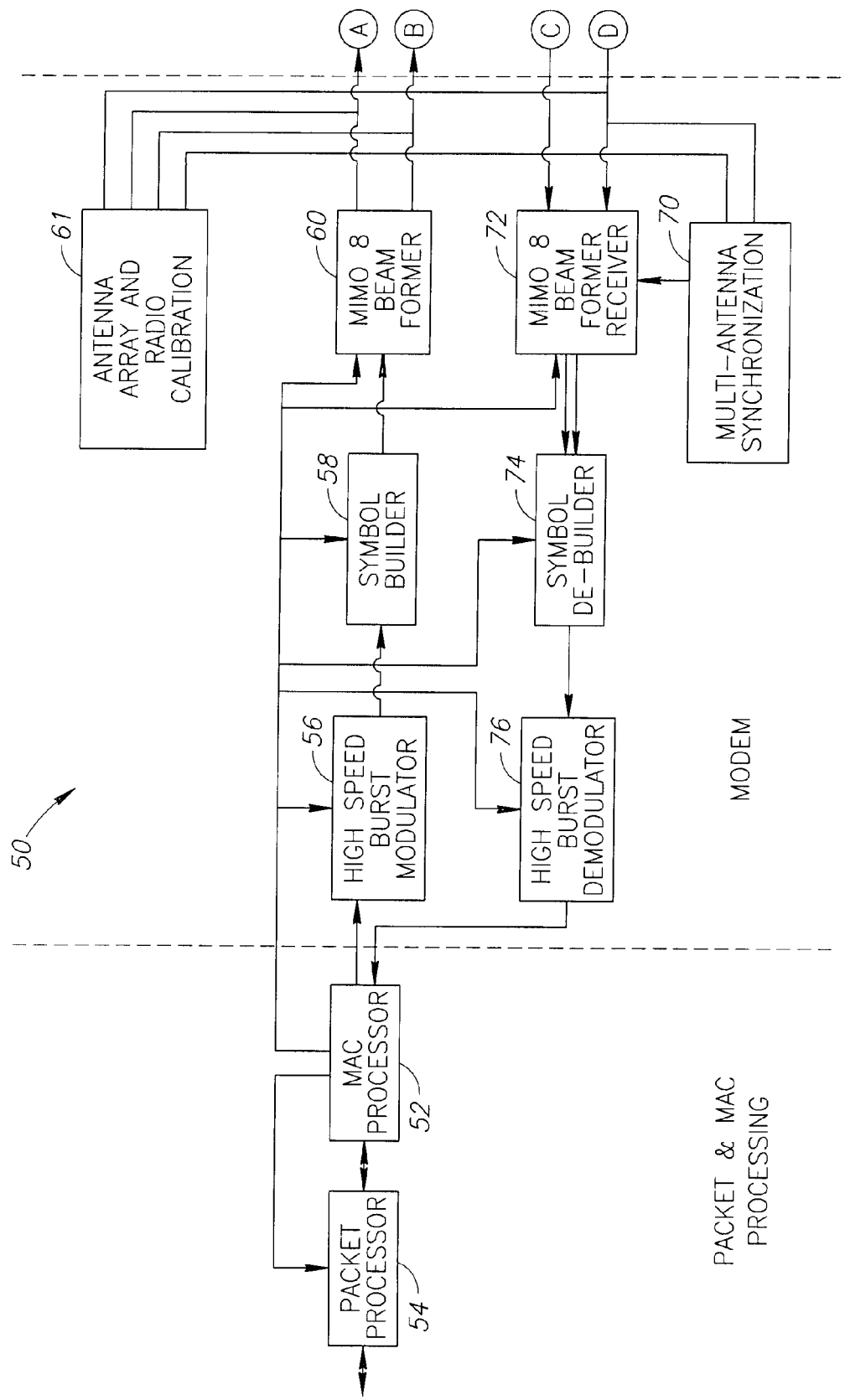
FIG. 4 is a block diagram illustration of an access point unit according to one embodiment of the invention.
Figure 4B:
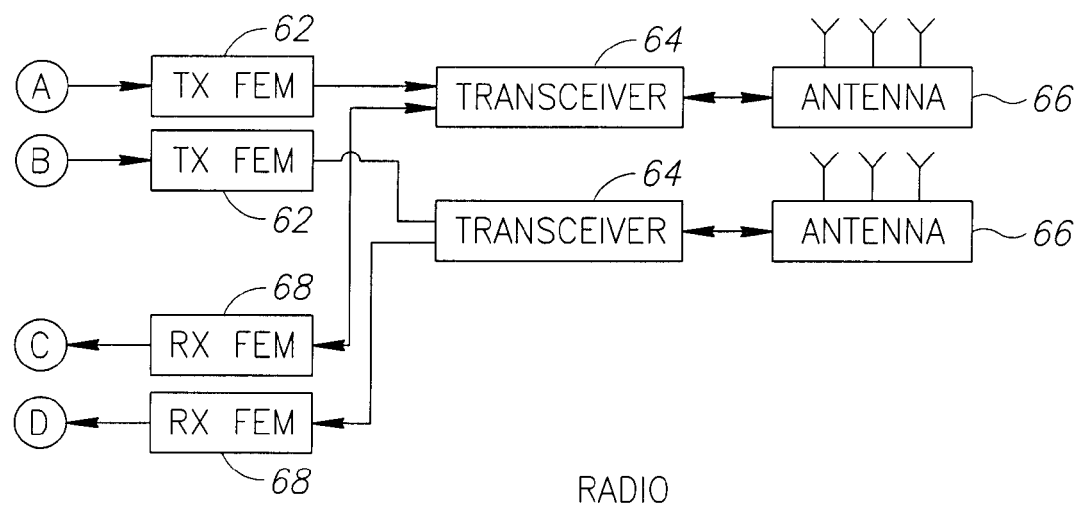

Referring now to FIG. 4, there is shown a block diagram illustration of one exemplary embodiment of an access point unit 50 according to the invention. The heart of access point unit 50 is its MAC processor 52 which directs and coordinates the operation of all the other elements in the unit. The MAC processor 52 is responsible for all internal-external data transfer integrity. Data is received from two main directions—the receiver modem path and external network feeding (by Ethernet or similar connection). Receiver modem data is transmitted further to other base or relay stations or to mobile stations, or to an external network, if the unit is a feeder. Data received by an external network should be routed to either the air interface modem transmitter toward a target base station over the air, or toward a target mobile station over the air, or toward a network element outside the system. The MAC layer serves also as a general data path controller for link establishment, link maintenance, controlling and signaling between different wireless stations. The MAC processor also validates all packet data passing through it in any direction.

Coupled to an inlet of the MAC controller is a packet processor 54. The packet processor is the heart of Quality of Service (QoS) based data flows and, when the access point unit is in transmit mode, provides data preprocessing and transmission preprocessing for MAC processor 52, which is significant in building a high integrity data transport layer between any two wireless stations. The integrity of received packets is checked and, preferably, only error free, full packets are available for further data routing by the packet processor.

Each data flow has its own properties (e.g., minimum bandwidth, maximum bandwidth, latency and priority). Packet processor 54 serves to receive and classify packets to be transmitted by access point unit 50. All data packets (incoming and outgoing) are monitored, counted, enqueued according to QoS parametric configuration (a set of QoS classifiers), and stored until transmission. The functions of the packet processor can be accomplished by means of hardware or software, and preferably utilizing soft partitioning between hardware and software, such that bit manipulation and critical timing processes are carried out in hardware, while non-critical timing and protocol management are accomplished via software.

Thus, all incoming data packets received from the data port are classified into unique data flows. The data flow counters are updated to reflect the actual status of the incoming data for traffic policy assurance and control. Packets may also be discarded if latest classification policy was breached, or the packet rate exceeds the queue limitation, or if there is any other violation of QoS purchased by the user. It will be appreciated that this method can provide dynamic data packet queues, i.e., packets of varying lengths, with varying waiting times can be stored in the same packet queues.

All outgoing data to the modem is preprocessed by MAC processor 52. The MAC adds headers, block enumerations, encryption and other air interface controls to be used by the MAC processor of the receiving node. These controls are compiled at the transmitter and decompiled at the receiver. Outgoing data to the feeder generally needs less preprocessing. MAC 52 decides, for each frame, from which queue to accept packets for transmission The MAC processor builds and stores a map of routes in the cluster from access point to access point. In addition, it periodically builds a routing table that defines which mobile station CID (connection ID) belongs to which access point according to this routing table and according to the topology built within cluster. The MAC knows the path to each CID and routes the packets along the required route. Each allocated packet from a queue is provided to the modem transmitter with air interface attributes, which may be selected from: modulation type (BPSK to 256QAM); antenna beam (which can be one of three sector beams, in access mode, or backhaul beam, while working in backhaul period); MIMO configuration; coding type and rate (such as CTC or PTC or CC at different rates, preferably as ½ or ⅓ or ⅔ or ¾ or ⅝ or ⅞); in the case of a backhaul packet, which backhaul beam is selected, and if it is to a mobile station, toward which mobile station to transmit it, among others. The MAC processor collects a set of packets with some of the same attributes (i.e., modulation, coding, stream, and antenna for access communications and, for backhaul packets, also having the same backhaul link) and sends the set of packets to a burst modulator 56 for processing the packets into bursts. The modem bursts and data capacities are dictated by a software scheduler in MAC processor 52 and defined in an air-map frame.

Burst modulator 56 is a high capacity burst modulator, and is responsible for the processing of the bursts configured by the MAC processor. Modulator processing includes bit randomization, coding, interleaving, repetition and modulation mapping. As known, the burst modulator process unit is a burst (a collection of frequencies over time). Each burst has physical layer attributes that define the exact processing that must be performed during processing. These attributes define the coding type (CTC, PTC, and CC) and rate, the modulation mapping (BPSK to 256QAM at present) and the repetition rate. These attributes are assigned by the MAC processor according to channel conditions and other link level parameters.

The burst modulator 56 produces symbol bursts for each sector over which the node is transmitting, ready to be processed toward the antennas 66. One feature of the present invention is that the same burst modulator 56 produces bursts for all the sectors, both access network and backhaul network, for all types of modulation, coding and MIMO streams. It will be appreciated the modulator 56 is differently configured for access and backhaul operation, according to MAC controller decisions, according to a destination air interface routing table and link conditions, such as SNR and interference measurements.

The processed bursts built by the modulator 56 are then passed to a symbol builder 58 that builds an OFDM symbol according to the number of streams, the sectors and the antenna technique that each burst should be transmitted with. Each burst's symbol is mapped to frequency and time slots into the OFDMA time/frequency map (described below) before transmission. Thus, in the symbol builder 58, each symbol is mapped in the frequency/time slot which was selected by the MAC processor for that transmission.

These OFDMA symbols from symbol builder 58 go to a MIMO processing and beam forming module 60, whose processes are known in the art. The MIMO subsystem is responsible for all the signal processing related to the multiple input-multiple output communication (where input\output refers to streams per user or users that share the same time\frequency resources). Both backhaul and the multiple access communications (e.g., WiMAX) may require the support of one or more of four types of MIMO techniques in use today:

1. STC—Space Time Codes (or Space Frequency Codes) e.g.—Alamouti Space Time Block Code (optionally coupled with MRC at the receiver) which is used to increase the SNR of a user's link using power and diversity gains.
2. MIMO multiplexing (or SDM)—multiple concurrent streams are transmitted to a user (e.g., 2 codes for 2×2 MIMO) and the user demodulates the multiple streams either with a linear receiver (e.g., LMMSE) or iteratively (e.g., SIC-Success Interference Cancellation). MIMO multiplexing is used for increasing peak rate by a factor of very close to 2.
3. SDMA (Space division multiple access)—multiple users are multiplexed on the same time\frequency resources and, in this way, capacity is increased. The base station can increase the user's spatial separation with additional beam forming, described below.
4. Adaptive closed loop beam forming (BF) is used to maximize the capacity of the multiple streams, wherein the base station forms the optimum beam for the user based on the user's feedback of its CSI (Channel Side Information) or a preferred codeword (e.g., by a known code book). An example of a closed loop MIMO scheme is the SVD approach, which uses unitary pre-coding.

In one exemplary embodiment of the system of the invention, which uses an antenna configuration of two sets of three antennas (two triplets), the STC and MIMO multiplexing schemes may use a pair of antennas (one from each triplet), while the triplet members may be used for sectorization within a cell.

An antenna array and radio calibration module 61 is provided for calibration of the transceivers and their associated antennas. According to one embodiment of the invention, for both transmission and reception, the antenna array and radio calibration, utilizing narrow beam forming, or null steering or SDMA, should be employed to calibrate the phase and the amplitude of the radio chains between each other, in order to provide adequate beam forming/SDMA performance.

From the MIMO/beam former 60, the data goes to a transmitter front-end module (Tx FEM) 62, the final block of the digital transmitter chain. At the output of the MIMO/Beam former, preferably an antenna matrix, allows any multiplexing combination between the logical antenna groups (the MIMO processor output) and the physical antennas (analogous to the Tx-FEM input). Tx-FEM 62 is responsible for transmitting the OFDMA signal via a transceiver 64 and associated antenna or antennas 66. A primitive description of its content would include: IFFT, CP insertion, spectral shaping, filtering, IQ mismatch compensation, and time\phase\frequency correction.

Transceiver 64, according to one embodiment of the invention, is a radio transceiver well known in mobile stations (e.g., cell phones), having a low form factor, utilizing low power, and having low cost. Such radio transceivers are manufactured and marketed by Analog Devices, Inc., Norwood, Mass., USA, e.g. AD9352 WiMAX/WiBRO RF MxFE™ transceiver, and Maxim Integrated Products, Inc., Sunnyvale, Calif., USA, among others, and are standard, off-the-shelf devices.

When the access point unit is in receiving mode, transmissions are received via antennas 66 and transceiver 64 and amplified and down-converted to baseband signals or to IF signals, depending on the architecture of RF transceiver 64. The incoming data is received in a receiver front end module (Rx FEM) 68, which receives the OFDMA signal transmitted to it and performs the inverse operation of the TxFEM, such as Analog to Digital conversion, spectral filtering, automatic gain control, frequency/time/phase correction, CP de-insertion, FFT. This OFDMA signal is then processed by a multi-antenna synchronization module 70 coupled to a MIMO and beam forming receiver 72. Multi-antenna synchronization module 70 synchronizes carrier frequency, symbol timing frequency, power and phase of all the signals received by the various antennas (six, in a preferred embodiment of the invention). Synchronization is required due to the fact that all the receiver paths including MIMO beam forming should work on baseband coherent signals. It will be appreciated that calibration data is received in synchronization module 70 from calibration module 61.

The synchronized signals are sent to MIMO receiver 72, which implements an interference cancellation algorithm between multiple streams received from the six antennas. This can be accomplished by well known algorithmic techniques, e.g., MMSE, SVD, BLAST, MMSE-SIC, MMSE-OSIC and other MIMO receiver techniques. It will be appreciated that different techniques may be used for access and for backhaul, since in backhaul it is possible to send channel side information via a robust feedback channel to the transmitter and use special beam forming to cancel interference in the transmitter, to significantly improve MIMO performance and reduce inter-stream interference.

From the MIMO receiver 72, the signals go to a symbol de-builder 74, where a group of OFDM symbols is de-mapped in time and frequency, either to a set of bursts (in access), as defined by the MAC processor, or, in backhaul, to the control channel defined during backhaul interconnection. The bursts are processed in a high speed burst demodulator 76, which performs symbol soft decoding, de-interleaves the burst, in case of repetition coding, combines repeated symbols in the time domain (and performs MRC on it), decodes it according to specific coding type, such as CTC or PTC or CC, and de-randomizes it to produce data packets which go to MAC processor 52 for further processing. All incoming data to the MAC processor 52 from the modem (received from the high speed burst demodulator 76) has to be checked for data integrity. Internal (RX modem) data is stripped from MAC headers and subheaders, decrypted (for encrypted data), checked for data continuity, retransmissions and other data inconsistency errors. The MAC processor assembles the packets from one or more data receptions from the modem RX path. Only error free, full packets are now available for further data routing by the packet processor 54.

All outgoing data is again classified into data flows. The data flow counters are updated to reflect the status of the packet buffer inside the access point unit. The MAC processor performs QoS algorithms for traffic monitoring in the transmission path out of the node to another node or to the wire line network toward the Access Service Network Gateway (ASNGW). Packets are usually discarded after being transmitted, but may also be discarded based on long waiting in queues.

It will be appreciated that, in the high capacity network of the present invention, the network's peak throughput can be higher than 200 Mb/sec. This requires a high rate of packet classification and priority management, mostly performed by dedicated hardware (the packet processor described above). Preferably, the unit includes embedded ARQ (automatic repeat request), which is known in the art. ARQ needs a close relation between the physical (modem) layer and the data layer. A high speed ARQ enforces embedding some of the ARQ processing in the MAC hardware section.

Antenna Configuration (Sectorization, MIMO, Beam Forming)

A sector is a logical entity (segment of bandwidth) managed by a single virtual MAC (MAC instance) and a modem functionality (physically including an antenna front end module, MIMO beam forming device and RF transceiver and antennas). Cell sectorization is associated with applying several PHY\MAC entities to a cell (e.g., three sectors per cell), where each sector gives service to a centralized zone in the cell, preferably 120° sectors. The antenna configuration in the system of the present invention allows inherent sectorization within a cell, by using directional antennas, or by use of beam forming techniques which control the radiation of the beams from omni-directional antennas. Virtual antenna sectorization permits the use of low cost omni-directional antennas, where the antennas utilized act as directional antennas towards each sector.

The MAC processor in each node knows how to decide which mobile station (or relay station) transmits or receives on each beam from each antenna. One embodiment of a method for associating a user with the sector that will serve it is accomplished by measuring the receiver's ability to receive and detect service from the given sector. The MIMO/Beam Forming Receiver has knowledge of detection quality of a given user from all the sectors existing in the cell. These criteria may be based on semi-static measurements (e.g., long averaged CQI (Channel Quality Information, such as RSSI, SNR and CINR), dynamic measurements (e.g., Channel Side Information (CSI)) or measured interference criteria. The node may obtain the required information explicitly (e.g., by user feedback) or implicitly, based on channel reciprocity (e.g., by sounding). Other techniques, including DoA (direction of arrival), DoD, MRC, MMSE, or others, can alternatively be used for detection of best antenna beam service for the mobile station.

Once the various sectors have been assigned, the MAC processor builds a database of all the subscribers in the network and their location in space (for both access and backhaul), which is used for directing bursts to the various sectors. The MAC processor configures the direction of the bursts for those mobile stations, and sends instructions to the burst modulator, the symbol builder and the MIMO beam former, and modem transmitter for transmission.

While each access point unit may include 6, 9 or even 12 antennas, the access point unit according to one exemplary embodiment of the invention incorporates six radio hardware chains, each of which transmits and receives RF signals to/from one of the six antennas, and the modem transmits signals over the six antennas to perform sectorization via beam forming techniques or MIMO. In this way, six complete channels are formed for smart antenna manipulations, such as beam-forming, and antenna diversity schemes, such as maximum Ratio Combining or STC, thus gaining range extension, reduced fade margin and improved link performance in multipath conditions. When using directional antennas, the direction and width of the beam are dictated by the antenna physical location and antenna characteristics. However, the use of omni-directional antennas permits later selection of beam characteristics by forming virtual antenna groups, using smart antenna techniques configurable by software.

Formation of virtual antenna groups, according to one embodiment of the invention, will now be described. A bit stream (data or symbols) to be transmitted can be transmitted over a link by all the antennas in the node or by sub-groups of antennas (e.g., 2, 3 or 6, depending on the total number of antennas in the node). As known, transmission of the same stream (1 stream) over all the antennas will improve the SNR, and the spectral efficiency will increase in proportion to the improvement in SNR. However, if the bit stream can be split into two or more MIMO streams by the modem (PHY) in the node, then the rate can be doubled (or higher) by transmitting more than one symbol on the same frequency at the same time. This, of course, will reduce the link budget per stream, which will reduce the SNR per stream.

Each MIMO stream is allocated an appropriate grouping of antennas, according to the network and/or the link configuration. Transmitting multiple streams can be accomplished when the streams are spatially separated. This separation can be gained by physical geometry separation between antennas or by rich scattering contributed by the channel, or where the streams are separated by polarization of the electromagnetic fields of the antennas, such that each stream has a different polarization, or by any other means of parallelization of the streams within predefined channels. Thus, the capacity can be increased by a factor of the number of streams since, when utilizing MIMO techniques, each receiving antenna can cancel adjacent stream interference, so as to properly receive the stream that was directed to it.

One proposed antenna configuration, illustrated schematically in FIG. 5a, involves allocating antennas to create two groups 80, 82 of antennas, each having three omni-directional antennas arranged in a triangle (as shown in hardware in FIG. 3a). As seen in FIG. 5a, the antenna groups 80 and 82 are spatially separated, with the distance d between antennas in each group typically being lambda/2, with distance L between two groups, typically >5 lambda. Alternatively, two groups of three omni-antennas can be utilized at smaller spatial distances, i.e. L<5 lambda, with polarization, i.e., one group being vertically polarized and the second being horizontally polarized, as when there is a 90° mechanical angular spatial separation between the antennas.

In the configuration of FIG. 5a, each group of antennas generates three beams 84 (of 120° each) using beam-forming, as shown schematically in FIG. 5b. In addition, a diversity scheme between the two groups of antennas is preferably employed, using transmit and receive diversity methods, such as STC (Space Time Coding), CDD (Cyclic Delay Diversity), MRC (Maximum Ratio Combining), selection diversity, which provide enhancement of the link budget, resulting in increased SNR and increased spectral efficiency. These techniques can be used in either access or backhaul or both. Thus, the transmission can use one stream with one of the above diversity schemes, or two MIMO streams to enhance the capacity while sacrificing the link budget.

As seen in FIG. 5b, six beams can form three virtual sectors, where each virtual sector transmits and receives in a different frequency range. Beam-forming can also be used for sub-sectorization of each sector into two sub-sectors (additionally increasing the link budget), to provide essentially six sectors 86, as shown in FIG. 5c. This technique is useful, in access only, to increase link budget. Here, each sub-sector is 60° (360°/6), so each pair of beams forms a sector and uses the same frequency group. In this embodiment, it is important to note that in order to produce 6 sub-sectors with two streams in the same time, twelve antennas are required, six antennas for 60° sub-sector and six antennas for the additional stream. In FIG. 5c, the pairs forming each sector are illustrated as being adjacent to one another, but they are not limited to such configuration.

When there are two MIMO streams transmitted over six antennas, each stream transmitted to and from three antennas, the beam width can be 360/3 or 120°. Thus, in this case, the rate is twice the rate of one stream and the spectral efficiency is twice that of one stream. However, the beam is wider, causing the link budget to go down.

Similarly, where three MIMO streams are transmitted over six antennas, each stream is transmitted to and from two antennas at a beam width of 360/2 or 180°, resulting in three times the spectral efficiency but much lower link budget and more difficult reception. This option requires an antenna configuration of three pairs of antennas (not illustrated).

To sum up, a number of possibilities could exist for each MIMO stream, depending on the configuration of the antennas and antenna beam-width. Each antenna can be arranged for 1, 2 or 3 MIMO streams having beam widths as follows, when using omni-directional antennas:

| | | |
|---|---|---|
| 6 antennas: | 1 stream | 60° |
| | 2 streams | 120° |
| | 3 streams | 180° |
| 9 antennas: | 1 stream | 40° |
| | 2 streams | 80° |
| | 3 streams | 120° |
| 12 antennas: | 1 stream | 30° |
| | 2 streams | 60° |
| | 3 streams | 90° |

An alternative proposed configuration is 6 antennas 88 arranged in a circle, as shown in FIG. 5d. With this configuration, two beams 89 of 60° are generated by the six antennas. Only beam forming for single transmissions or SDMA for multiple concurrent transmissions (described in detail below) can be utilized. (Since these antennas are not sufficiently separated spatially, MIMO cannot be utilized.)

Another alternative embodiment is to utilize a plurality of directional antennas. For example, using directional antennas of 90° each, the angle of each antenna should be 90° divided by the number of antennas times the number of streams.

Although the number of antennas is configurable (i.e., selected in advance and fixed in the hardware), the number of streams preferably is dynamic and adaptive, and is adjusted over time. Preferably, 1, 2 or 3 MIMO streams are adaptively allocated to different antennas, depending on measured link conditions, and the bandwidth beam pattern (from 180 degrees to 60 degrees) is selected to improve link budget. Thus, the number of streams is selected depending on the amount of interference, noise, signal strength (RSSI), CINR (Carrier to Interference and Noise Ratio), etc., at any given time along the link. Accordingly, the number of streams can change periodically, although not necessarily in real time.

The receiver side of each access point node in the network preferably provides statistical information to the transmitter in the other node on its link required in order to permit adaptive allocation of not only MIMO streams, but also of modulation and coding, as described below.

Access Network

It is a particular feature of the present invention that the novel WiMAX network is fully WiMAX compliant. It includes a 802.16e-compliant base station, having full PHY and MAC features, as per 802.16e wave 2 WiMAX profile or any WiMax profile which will be adopted from time to time. It supports optional base station features in wave 2 (IO-BF, IO-MIMO). In addition, it supports channel bandwidths of 3.5, 5, 7 and 10 MHz, and supports WiMax Networking architecture and interfaces. Furthermore, the network is transparent to WiMAX and to other wireless networks.

Self Learning

The network of a preferred embodiment of the present invention is characterized by self-learning, which permits self-installation and self-interconnection of nodes. A self-installed WiMax access point network eliminates the need for deployment network planning, i.e, frequency planning, antenna direction alignment, antenna width tuning, and power allocation to each sector, each of which is required in conventional systems. This is accomplished by means of a mechanism which performs self learning during deployment by determining physical layer parameters of neighboring base stations, and selecting its own physical layer parameters in accordance therewith. This mechanism is described briefly below, and in detail in Applicant's co-pending application entitled ACCESS POINT PLANNING MECHANISM.

Deployment of the network is substantially as follows. A network plan is devised, indicating locations of feeder nodes, based on coverage predictions. A default configuration for beginning work is programmed into the feeder nodes, and the feeder nodes are coupled to the data feeder (wired backbone). A clusterization network plan is also set—i.e., whether multiple clusters forming the network will utilize the same frequency, or whether a frequency re-use scheme (typically, re-use 1:3 or re-use 1:1 or re-use 3:3) (described in detail below) will be utilized.

Each access point in the network transmits within its selected bandwidth. When a new access point enters the network, it must first receive transmissions from all the access points already around it in the network. Self-installation is enabled by self-planning algorithms utilizing smart antenna technologies. As part of its self-installation process, each access point unit performs space and frequency channel sounding, so as to produce an "RF spatial map" of the environment frequencies, i.e., on which frequencies which nearby access point units are broadcasting.

In one preferred embodiment, during the self learning process, the access point automatically detects WiMax 802.16e physical layer parameters of the clusters around it, including the existence of a frequency re-use scheme, and whether any WiMax frame permutation methods—PUSC, FUSC or AMC schemes—are in use. It also detects beam direction of departure from the edge access points of each of the surrounding clusters, as well as the beam width and pattern and sectorization beam center.

Based on the signal strength, direction and other selected parameters of the signals received, the new access point selects the appropriate physical layer parameters for itself, including bandwidth (frequency range), FFT size, guard time used, permutation scheme, directions of beam arrival and the distribution of the beam in space, as well as beam power, for each sector of its own access transmissions, as well as the frequency to be assigned to each virtual sector (in case of re-use 1:3).

In order to perform this function, one preferred embodiment employs software that controls the modem and radio performance, in order to incorporate a Spatial Spectrum Analyzer, which enables spatial spectral interference management. The new access point determines which frequency or frequencies are available in which directions, with the least interference from adjacent access points, and then utilizes beam-forming techniques to maximize its own coverage. Interference management is based on the principle that fixed beam forming in access generates a constant interference pattern, and constant interference is manageable. The access points of the present invention take advantage of interference knowledge, and utilize power control, and sub-channel management, as well as null steering (spatial filtering in Up Link and Dl Link) and in-band sub-channel selection in Down Link, for interference management, as known. Additional techniques that can be used for interference management in the access network include frequency re-use as described below and use of multiple sectors as described above.

Frequencies Re-Use

Figure 6A:
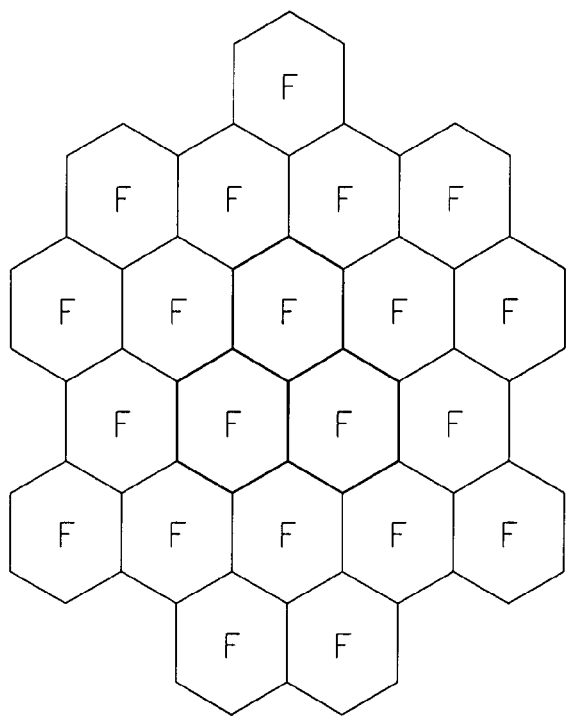
FIG. 6a is a schematic illustration of a 1:1 frequency re-use scheme.
Figure 6B:
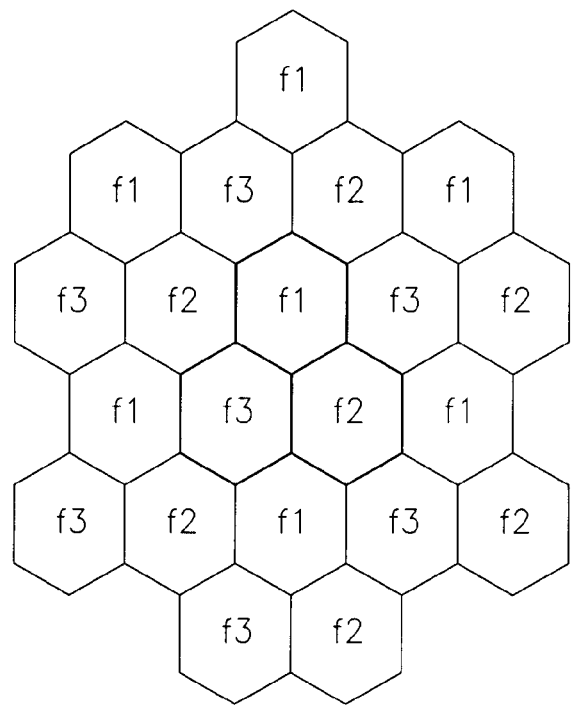
FIG. 6b is a schematic illustration of a 3:3 frequency re-use scheme.

The network of the present invention supports several radio access network deployment frequency re-use schemes. The frequency re-use scheme defines the division of bandwidth (frequency channel) between sectors of a cell or between entire cells. A frequency reuse of 1:1 (as Full Usage of Sub-Carriers (FUSC) in WiMax) implies that all cells use the same sub-carriers (frequency band or sub-band) F across their borders, as illustrated in FIG. 6a. Though this system features maximum spectral efficiency and does not require resources for planning allocation, relatively large inter-cell interference is generated. An alternative re-use 3:3 is shown in FIG. 6b, where each cell in each group of 3 cells utilizes a different frequency band or sub-band $f_1$, $f_2$, $f_3$ (out of 3 possible bands). This arrangement provides increased link budget in each cell at the expense of capacity of each cell, which is reduced to one third.

Figure 6C:
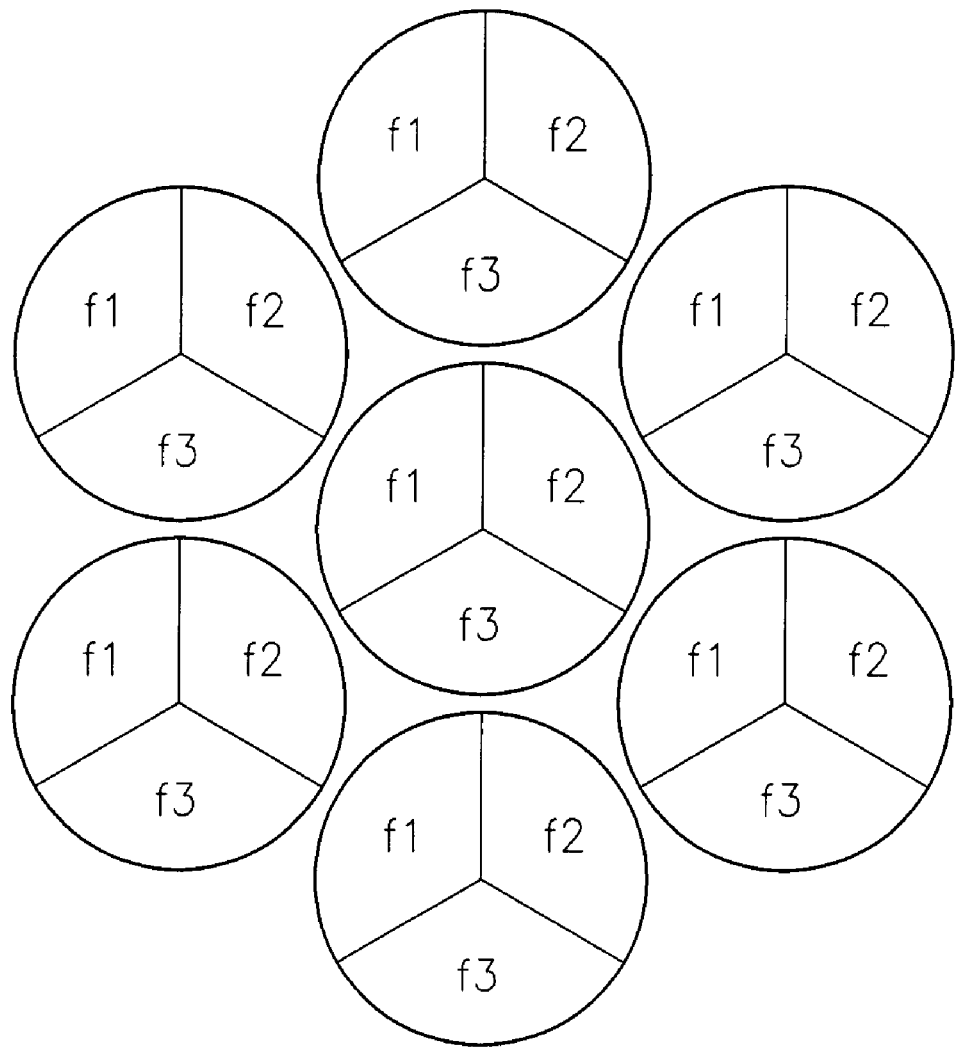
FIG. 6c is a schematic illustration of a 1:3 frequency re-use scheme.

A frequency re-use scheme of 1:3, as shown in FIG. 6c (e.g., as in Partial Usage of SubCarriers (PUSC) in WiMAX), indicates that each cell is divided into three sectors, and each sector operates in a different frequency band or sub-band (⅓ of the spectrum) $f_1$, $f_2$, $f_3$, with coordination between cells to minimize interference. In this case, beam-forming is used to perform virtual sectorization, as described above. This approach minimizes inter-cell interference, though the peak spectral efficiency is degraded by 3 on each sector, thus each sector peak rate is reduced by 3.

The frequency re-use scheme will be selected depending on the network deployment topology. Re-use 1:3 is the default re-use scheme for use by the access point. In this case, the available bandwidth is divided to 3 groups of bandwidths, each driven by a separate MAC instance (virtual portion of the MAC controller) or preferably, the MAC controller manages three MAC instances, one for each virtual sector. Thus, a single controller coordinates and controls all three groups. Power management on each sub-carrier, sub-band or band is provided to control access point density topology and network interference management.

It will be appreciated that this process can be implemented manually, by an operator, rather than automatically by the access points of the system. Thus, this process can be utilized with or without other processes and mechanisms described in this application. Similarly, self-installation is an option which provides advantages in the network, but it is not required.

Self Interconnection

Best Route Selection

Figure 7:
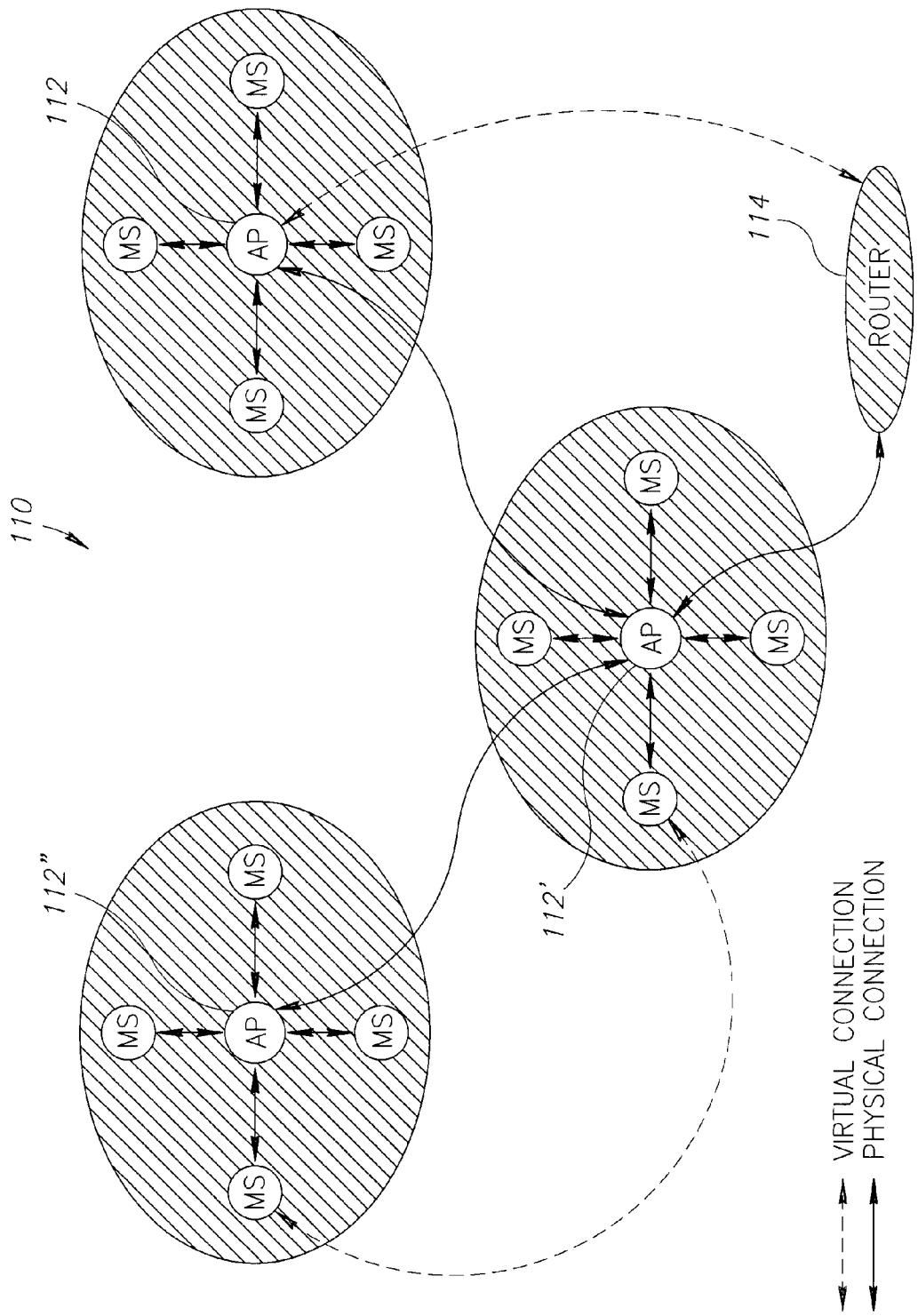
FIG. 7 illustrates smart connectivity MAC principles, according to one embodiment of the invention.

To sum up, when a new access point node 112 is added to the network 110, it first undergoes installation in the access network (either self-installation or manual installation by an operator), which means that it performs multiple access beam forming adaptation and power adaptation to enter the existing re-use deployment scheme. In one embodiment of the invention, the new access point now undergoes self-interconnection (or manual interconnection by an operator), in order to enter the backhaul network, as illustrated schematically in FIG. 7. By the end of the self interconnection process, the feeder node will allocate to the new access point a backhaul time slot within the cluster.

The self-interconnection process is substantially as follows. The new access point 112 must be synchronized with all the access points 112', 112" around it in the cluster that are transmitting a downlink signal in its range of frequencies. By utilizing beam forming techniques, the access point maps the various access point transmissions, the angle of arrival from each access point, signal to noise ratio (SNR) over all the routes toward one or more feeders in its range, available capacity, interference metrics, and other selected parameters. A router 114 may be provided to feed data to the feeder. (The router is above the WiMAX air interface network.)

In accordance with the mapped data, a feeder node will select the best route to it for the new access point. This will be the route on which the new access point entering the cluster will experience the best throughput performance without substantially reducing the feeder node capacity. In case there is a conflict between these two requirements, the feeder node capacity has higher priority.

Backhaul Allocation

Figure 8:
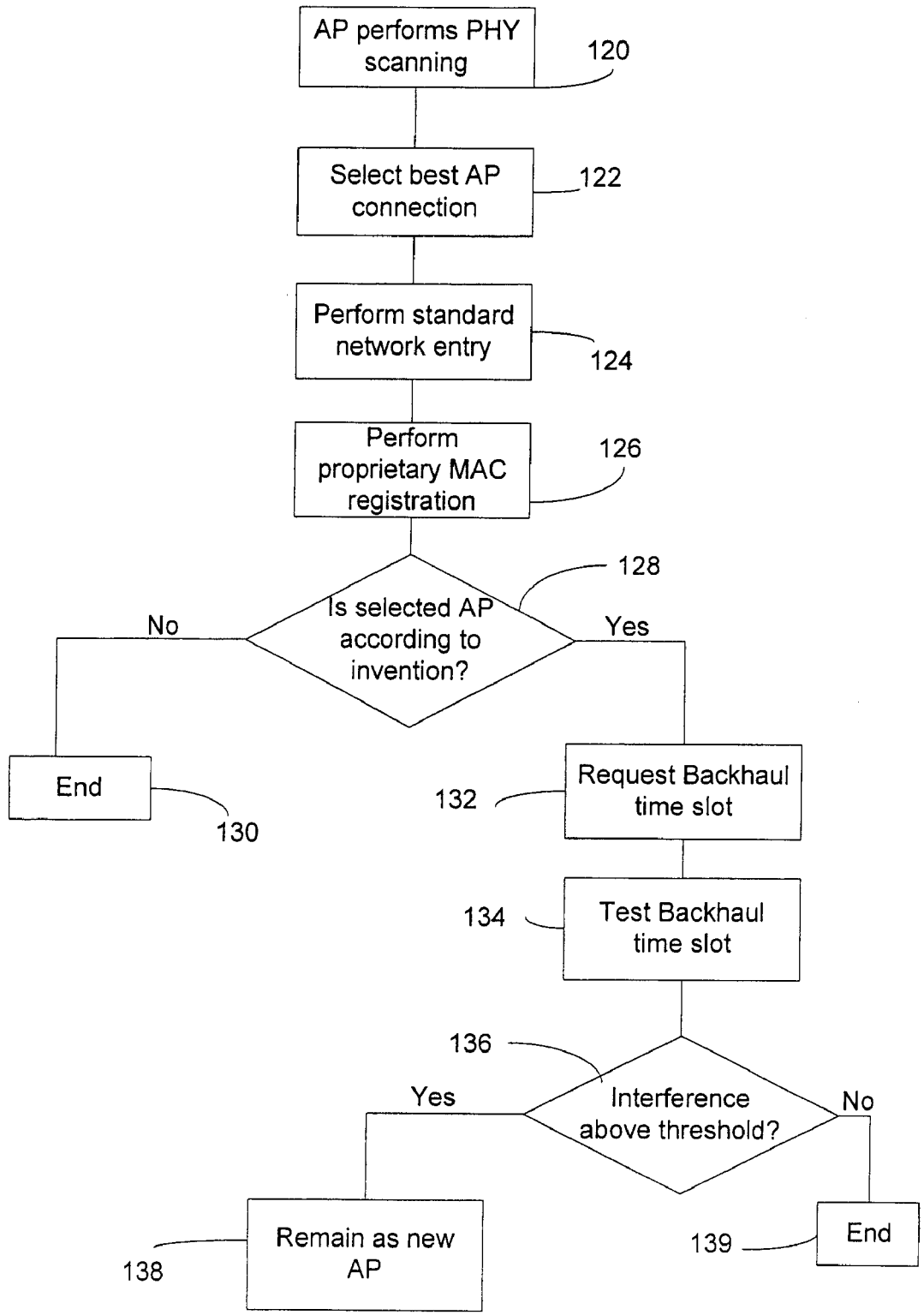
FIG. 8 is a flow chart illustrating backhaul time slot allocation, according to one embodiment of the invention.

The new access point 112 now connects to the selected access point 112' (which may be the feeder node or another access point (relay node) which is, itself, coupled to the feeder node), as if it were a mobile station. The self-interconnection process of an access point (AP) to the backhauling network, according to one embodiment of the invention, is illustrated in block diagram form in FIG. 8. While the access point underwent self-installation, it performed pre-selected physical layer scans (beams, azimuths, frequencies, modem specifics parameters, etc.) and located one or more access points transmitting on different frequencies (block 120). According to the collected data from these scans, the self-installing access point selects the best access point to communicate with (block 122) based on link conditions, and performs a standard 802.16e network entry registration (block 124) as a 'Special Mobile Station', which includes ranging processes, capability negotiation, etc., ending by registering to the preferred access point. This means that the new access point performs a proprietary MAC registration (i.e., communicates via, for example, an IEEE802.16e network entry protocol) with the feeder, either directly or via a relay access point, and requests a backhaul slot (block 126). If the selected "best" access point is not an access point according to the invention (block 128), the new access point continues to provide access services to its mobile stations, and continues to seek a backhaul connection elsewhere, thus ending the registration process (block 130).

If the selected access point is an access point according to the invention (block 128), at the end of the registration process, a special MAC message will be sent to the access point indicating this fact. The access point will now request the feeder to allocate to it a backhaul time slot (block 132). (In the case of a multi-hop relay, the relay will forward the request to the feeder.) The feeder now selects the best backhaul route to the feeder node and allocates temporary PHY and MAC parameters, such as available capacity, time slots, sub-carrier allocations and other interference and cluster-related parameters (block 134). In one embodiment of the invention, during the following transmissions, the access points measure the interference in the entire cluster generated by transmission on the proposed link (block 136) to determine the level of interference generated (block 137). If the best connection for the access point results in interference for the cluster above a pre-selected threshold level, the feeder will reject the connection (block 139) and disconnect the new access point, and it will have to seek a different feeder in another cluster.

Once the new access point is transmitting and receiving over the backhaul network, the feeder will again perform interference mechanism in the cluster as described in detail below. This new route remains as a fixed route until a change occurs within the access point clusters, or the feeder decides to change the route due to interference issues.

It will be appreciated that, since the feeder node decides on the best route of hops to interconnect each access point with each other and with the feeder access point, once a backhaul time slot has been allocated to a new access point, the feeder must reconfigure the backhaul over the entire cluster, taking into account topology and interference measurements over the network. The feeder now re-allocates backhaul time slots between each link in its cluster using the mechanism described below. The routing protocol is controlled by the feeder access point such that the feeder sets up each route to each access point based on spatial interference between access points and within the frequency band interference. Periodically, the feeder access point can update the routing table for each access point to the feeder access point.

The feeder access point reserves a constant capacity (e.g., allocation of time over channel bandwidth) for each access point within the cluster. It should be noted that the feeder access point can learn the traffic requirements for each access point toward a route and dynamically optimize it, by adapting the capacity to each route based on a set of predefined operator rules, such as minimum delay to a predefined access point, prioritizing the access point within the cluster (access point class of service), access point minimum/maximum rate, average rate, constant rate requirement and any other additional rate management required by the operator. A connection-oriented protocol preferably provides fully controlled latency and jitter –1-2 frame constant delay.

Periodically, the feeder measures the interference in its cluster during access transmissions and can adapt power, beam direction, PHY configuration and frequency in order to reduce the interference to the minimum level possible, under current conditions. The feeder will instruct whichever node is causing interference in the cluster to lower its power and measure again. It will be appreciated that, as additional access point units are added in a given area, in order to increase capacity, it is possible that the feeder node, itself, will be the node causing interference in the cluster. If this is the case, the feeder will reduce its own transmissions in access until the interference is resolved. Thus, in some cases, the feeder will no longer be required for access transmissions at all, but can devote itself to providing only backhaul services for all the relays in the cluster coupled to it. This mechanism for backhaul is described in detail below.

It will be appreciated by those skilled in the art that self-planning saves the frequency planning costs from the operator. Self-planning is preferably performed automatically periodically, as well as upon any change event in the network. It is essential mainly when increasing the access point density ("capacity phase") of the network.

Another advantage of the present network is that it is self-healing. The network is resilient, and can reduce network failure substantially to a single point. Thus, if an access point discovers that it can no longer contact an adjacent access point, it will notify all the other access points in the cluster and adjust its own installation parameters accordingly.

According to one embodiment of the invention, a protocol runs periodically between each feeder and its associated access points, to check that all registered access points still exist in the network, similar to a "keep alive" message transmitted periodically, which is acknowledged by each access point. Preferably, each access point also can run a self connectivity "keep alive" to the access point it is attached to, to ensure that it is still connected to the network. In case the access point does not receive any keep alive message from the cluster feeder for a pre-defined period of time, it will conclude that the adjacent access point is lost. Similarly, the feeder node and other access points coupled to the lost access point will discover the absence of that access point. The disconnected access point or points will now undergo re-registration, self-installation and re-connection, as described above. It will be appreciated that, at this time, the access point may connect to a different access point or even to a feeder node in a different cluster, depending upon the operator strategy and the local conditions.

It will further be appreciated that, if the node which loses connectivity is a feeder node, all of the access points previously connected to it will automatically undergo re-installation. Of necessity, all these access points will now connect to feeder nodes in different clusters, at least until the original feeder node is replaced, if at all.

The interconnection process described above is automatic and self-contained within the various access points, thereby providing certain advantages to the network (particularly in cost and uninterrupted service). However, it will be appreciated that, alternatively, this interconnection can be accomplished manually by an operator. Thus, this process can be utilized with or without the other processes and mechanisms described in the present application.

Access/Backhaul Coordination

In-Band Backhaul

Figure 17:
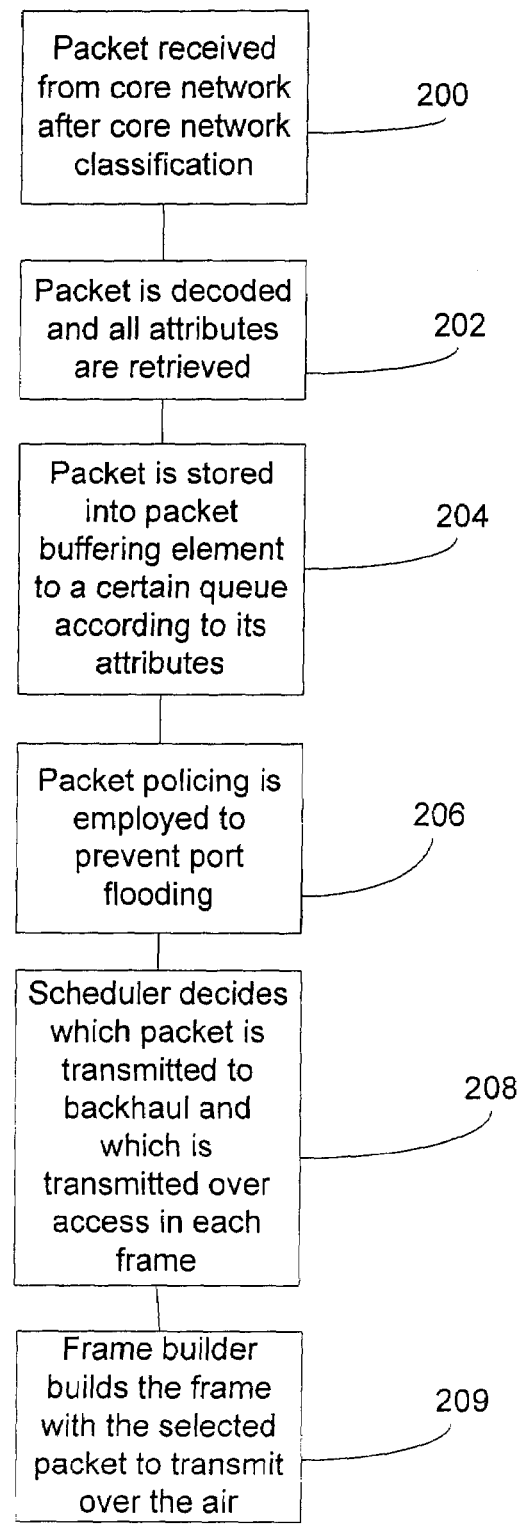
FIG. 17 is a flow chart illustrating packet selection for transmission, according to one embodiment of the invention.

As stated above, a single scheduler within each access point unit manages both the access and backhaul. One example of a decision-making process of the scheduler is described in FIG. 17. A packet received from a core network is received in the scheduler after having been classified by the core network (block 200).

The packet is parsed, and selected attributes (for example, addresses, QoS) are retrieved (block 202). Each packet is stored in a packet buffering element (e.g., a memory) (block 204) in a certain queue, according to its retrieved attributes. Preferably, packet policing is utilized (block 206) to permit only an appropriate number of packets onto the link, to prevent port flooding and to limit the packet rate of each queue to the QoS rate required. The scheduler now decides which packets in which queues are to be transmitted over backhaul to the destination access point, and which packets are to be transmitted over their access links, in each frame (block 208). The frame builder in the MAC builds each frame with the selected packets, for both backhaul and access, for transmission over the air (block 209).

Figure 18:
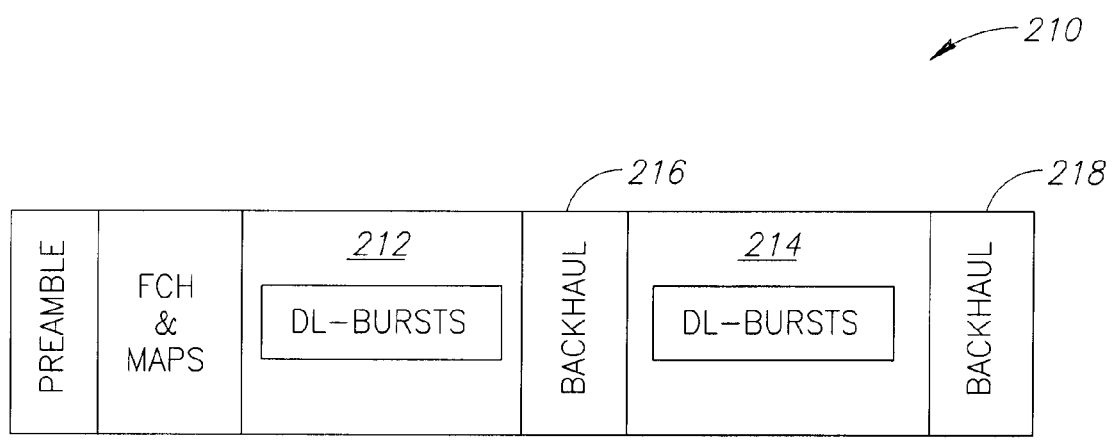
FIG. 18 is a schematic illustration of a transmission frame, according to one embodiment of the invention.

The in-band backhauling may be performed by allocating a time slot for backhaul traffic (a 'Backhaul period') in each WiMAX frame 210. As seen schematically in FIG. 18, the WiMAX frame 210 may be divided into an 'Access period' 212 for downlink and an 'Access period' 214 for uplink, and a 'Backhaul period' 216 for downlink and a 'Backhaul period' 218 for uplink. The access period and the backhaul period are coordinated and synchronized, thus avoiding interference between the access communication and the backhaul communication, even while they are operating over the same frequency.

Referring now to FIG. 19a, there is shown an example of 4 nodes in a star topology. The feeder 220 is coupled to, and controls transmission of, three access points 222, 224, 226 each of which, in turn, is coupled to a plurality of mobile stations (not shown). Associated transmission frames are illustrated schematically in FIG. 19b. As can be seen, the frame of feeder 220 has a time slot 228 for access and three time slots 230, 232, 234 for backhaul, one for backhaul communication with each access point 222, 224 and 226. (It will be appreciated that both uplink and downlink time slots are provided in the frame, although only one is illustrated.) The frames of each of the access points 222, 224, 226 has a corresponding backhaul slot 230', 232' or 234', and an access time slot 236 (or two) longer than that of feeder 220, since each access point can provide access communication during the entire period when it is not communicating with the feeder 220 (backhaul).

According to one exemplary embodiment, the star-3 topology assumes a 2 stream MIMO configuration in a point-to-point backhaul link and a spectral efficiency factor of about 8 times higher than the average access spectral efficiency. The duration of the backhaul period in the frame is 12.5% of the duration of the access period per backhaul link. The average capacity waste due to backhaul overhead is about 20%, while the overall network average node capacity is about 80% of the maximum node capacity.

According to another embodiment of the invention, a multi-hop topology can be utilized. In FIG. 20a, there is shown an example of 4 nodes in a multi-hop topology. The feeder 240 is coupled to, and controls transmission of, an access point 242 and a relay 244 which, in turn, is coupled to access point 246. Here, too, each of the nodes is coupled to a plurality of mobile stations (not shown). Mapping of access and backhaul frames over these four access points is illustrated schematically in FIG. 20b. In this case, the frame of feeder 240 has a time slot 248 for access and two time slots 250, 252 for backhaul, one for backhaul communication with access point 242 and one for backhaul communication with relay 244 and, through the relay, with access point 246. (Here, too, both uplink and downlink time slots are provided in the frame, although only one is illustrated.) The frames of each of the access points 242, 244, 246 has a corresponding backhaul slot 250', 252' or 254', and an access time slot 266 (or two) longer than that of feeder 240. As can be seen, the backhaul slot of relay 244 is of the same length as slot 252 of the feeder, since relay 244 must provide backhaul communication both for itself and for second tier access point 246.

It is preferable to minimize the duration of the backhaul period, thus decreasing the backhaul network overhead in favor of increasing the access capacity. This is achieved by employing ultra-high-capacity links in the backhaul network, as described below. The Point-to-Point (PTP) backhaul link used for inter-access point interconnection has a significantly higher capacity compared to the average aggregated node access capacity (which can be on the order of 6-12 times higher). By employing ultra-high-capacity links in the backhaul network, a "narrow" time slot is sufficient for backhauling all the aggregated traffic of the node, even when relaying the entire traffic of another node, resulting in low overhead on the node. By utilizing radio resources re-use (described below), the loss on each frame can be reduced, as some of the resources are re-used by multiple concurrent transmissions.

It will be appreciated that this method, when utilizing frequency re-use or division schemes, can lead to a large number of time slots for transmitting and receiving access communications and for transmitting and receiving backhaul communications, requiring many transitions from transmission to reception in each frame. This can be problematic, due to the hardware limitations regarding the time required for conventional transceivers to convert from one to the other. Accordingly, it would be desirable to provide a method for minimizing the number of transitions between transmission and reception in such cases. According to one embodiment of the present invention, this can be accomplished by the feeder MAC causing the frame builder to build each frame with all transmission time slots adjacent one another and all receiving time slots adjacent one another. Preferably, consecutive frames begin with the same state of the transceiver as the previous frame ended. While this embodiment has great advantages in terms of efficiency of the overall network, it requires coordination throughout the network of the various feeder MACs.

Backhaul Network

Link Level—Definitions MIMO, BF, Modulation

The backhaul network of the present invention utilizes a novel point to point (PTP) communication system providing a broadband wireless backhaul interconnection between the nodes forming each link in the network. A conventional backhaul network, preferably a wired network, may be utilized to provide backhaul between the core network and the feeder node in each cluster. The PTP communication operates over the same spectrum allocation (same frequency channel) and same channel bandwidth (utilizing the same frequency channel slice) that is used for multiple access to the wireless subscriber terminals ("in-band" backhauling). The present invention has aspects affecting two levels of the communication network—the link level, providing a high capacity link between two nodes, and the network level, providing a backhaul network utilizing one or more interference mitigation mechanisms between links which are operative concurrently, to significantly reduce disruptive interference. These two aspects will be described briefly below. This communication system is described in more detail in Applicant's co-pending patent application entitled: POINT-TO-POINT COMMUNICATION METHOD WITH INTERFERENCE MITIGATION.

Each backhaul link is a high capacity point-to-point link connecting one node in the network to another node, transferring its aggregated traffic towards the core network. The high capacity in the PTP link is achieved via methods of increasing the link spectral efficiency (transmitted bits/sec/Hz), although this compromises the link budget (thus reduces the permitted signal loss during communication propagation). Preferably, this is accomplished by performing high density linear modulation, preferably QPSK to 256 QAM (at present), and providing multiple concurrent transmissions over multiple antennas forming MIMO (Multiple In/Multiple Out) streams. According to one embodiment, multiple concurrent transmissions are provided by creating virtual groups of omni-directional antennas, each group creating a beam at a certain beam width and transmitting a single stream. In this way, the spectral efficiency can be increased using MIMO antenna techniques (adaptively allocating 1, 2 or 3 MIMO streams to different antennas) for point-to-point transmissions over a single link, resulting in a PTP link with much higher spectral efficiency compared to the average access network spectral efficiency. Theoretically, the spectral efficiency is improved by a factor of the number of streams (under the assumption that the channel is rich in terms of multi-path, which allows several concurrent streams which are spatially separated), as known.

Alternatively, SDMA (Spatial Division Multiple Access) can be used for point to multi-point backhaul transmissions over several spatially separated links between access points, as described below In this way, the present invention provides improved PTP communication having high frequency diversity, variable modulation, turbo or non-turbo coding, preferably using MIMO and dynamically adapted Beam Forming, according to the instantaneous radio link conditions (such as Signal to Noise Ratio) based on measurements performed over each single link, or, when in a network, over all the links in the cluster. In one embodiment of the invention, a plurality of directional antennas can be utilized instead of omni-directional antennas, and the number of MIMO streams will be defined in accordance with the number and beam width of the antennas.

It will be appreciated that rate optimization can be provided, while compromising the extra range, by using higher modulation, preferably 128-256 QAM, in the PTP link, and by using MIMO, preferably 1 stream to 3 streams, to increase the rate in the PTP link. Furthermore, the rate in the PTP link is adaptive—it can be adapted according to the link conditions (SNR or CINR, BER or any other interference estimation) to achieve up to 256 QAM modulations. Adaptation of modulation can vary between QPSK, 16 QAM, 64 QAM, 128 QAM and 256 QAM, with the optimal modulation being selected in accordance with a pre-defined modulation adaptation scheme.

Figure 9:
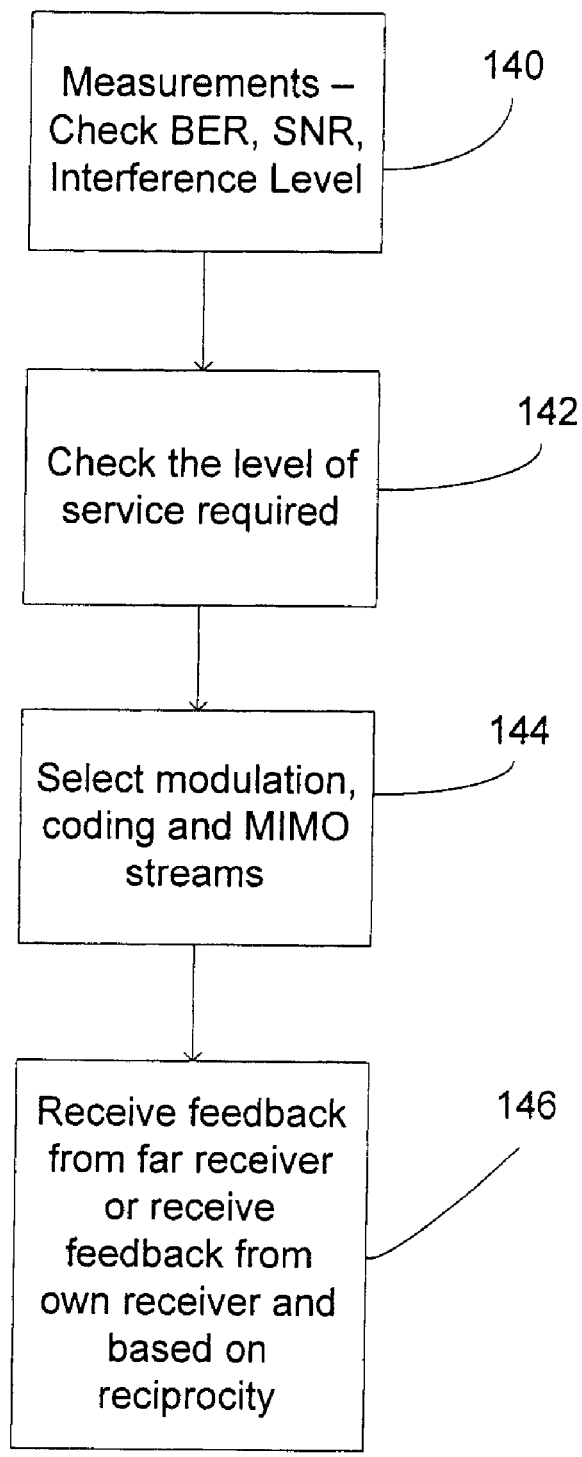
FIG. 9 is a flow chart illustrating adaptive parameter selection, according to one embodiment of the invention.

Adaptation of MIMO streams and modulation are interrelated and preferably are jointly determined. The adaptation of the modulation, coding and MIMO streams is based on the link SNR, level of interference and Bit Error Rate experienced within the link. See, for example, FIG. 9, a flow chart of a link adaptation process according to one embodiment of the invention, carried out by the MAC controller. As illustrated, each node sends a CQI (Channel Quality Information) message over the link (block 140) and receives the CQI message sent by the node connected to it (block 146). The CQI message can carry information on CINR on each remote antenna (block 140), e.g., effective CINR sampled by the remote receiver after the multiple antenna demodulating processing, received BER (Bit Error Rate) or BLER (Block Error Rate), received RSSI on each remote antenna, effective RSSI sampled by the remote receiver after the multiple antenna demodulating processing, and/or any additional link level estimator providing information on the link quality, due to signal attenuation or interference (block 140). In an alternative embodiment, the CQI information of each link side receiver is used to adapt the modulation of the link in its transmission by using channel and interference reciprocity. This will reduce complexity (no need for feedback), but also reduces the link adaptation performance.

The level of service required for the link (stored in the memory) is now checked (block 142) and, in accordance to pre-defined schemes, the modulation, coding and number of MIMO streams are selected (block 144), based on the measured and reported CQI data. In one embodiment of the invention, a possible adaptation scheme (modulation, coding, MIMO) is described below:

Each node reports to the remote node its CQI over a robust link over the air.

Each CQI is received from the remote node and reported to the MAC controller.

The MAC controller adapts the modulation, coding and MIMO streams allocation over the link based on predefined CINR required per modulation and MIMO scheme. Alternatively, the CQI can provide information regarding the MIMO streams' spatial separation of this specific link. This determines the capabilities of this link to operate in MIMO. If it is capable, MIMO will be enabled on this link. If not, beam forming will be explored on both sides of the link.

After the MAC adapts the modulation, coding and MIMO streams over the link, it will track the link conditions by monitoring the CQI from the remote link such as BER or BLER. In case a high BLER or BER is observed, the MAC controller will iteratively decrease the modulation, increase coding and de-allocate MIMO streams until a pre-selected required BER is obtained. (It will be appreciated that it is not correct to look only at the BER of the node's receiver, due to different interference pattern on both end of the link.)

If desired, due to the fact that the PTP backhaul link will experience a high CINR, a backhaul coding scheme, which is not in used in IEEE 802.16e, can be used in addition to convolutional code and convolutional turbo code. A block turbo code or product turbo code, which is adapted to high SNR or CINR and high capacity (low latency iterative decoding), can optionally be used for backhaul PTP coding, particularly at higher modulations. This, theoretically, will increase coding gain of about 2 db at 25 db CINR link condition.

The following table provides several link level physical layer configuration and respective spectral efficiencies achieved according to them.

Spectral efficiency defines the maximum number of bits which can be carried by one Hz over the air.

| Maximum modulation (assuming turbo coding with ~0.9 rate and other PHY overhead) | Number of MIMO Streams | Spectral efficiency |
|---|---|---|
| 64 QAM | 1 stream | 5 bit/sec/Hz |
| | 2 streams | 10 bit/sec/Hz |
| | 3 streams | 15 bit/sec/Hz |
| 128 QAM | 1 stream | 6 bit/sec/Hz |
| | 2 streams | 12 bit/sec/Hz |
| | 3 streams | 18 bit/sec/Hz |
| 256 QAM | 1 stream | ~7 bit/sec/Hz |
| | 2 streams | 14 bit/sec/Hz |
| | 3 streams | 21 bit/sec/Hz |

Interference Mitigation

When there is more than one link utilizing PTP communication according to the invention near one another, interference is likely to arise during concurrent transmission over spatially close links. By observing link conditions throughout the cluster, the feeder node self-learns the interference within the cluster on each backhaul link, and adaptively optimizes the cluster backhauling links to the network by tuning beam width, power, sub-carrier allocation and modulation. In order to collect information about link conditions, the feeder node periodically exercises the interference within the cluster. Interference exercising, in one embodiment, is carried out by allocating a pilot frequency within the channel bandwidth for interference management, uniquely for each link. Thus, a specific node has the capability to measure its unique link CQI and interference power on another link by measuring the power on the pilot of the adjacent link within the cluster and on adjacent clusters. (The feeder instructs some or all of the nodes to transmit, and receives feedback regarding quality of the received transmissions from its remote nodes and interference estimation of each node within the cluster impacting this link). The node then adapts all link parameters based on the interference, and load balancing.

In order to improve performance, interference mitigation is highly desirable. A number of mechanisms are available for such interference mitigation, particularly for the backhaul PTP link, which are designed to maintain a CINR as high as possible in each link, so that the spectral efficiency of each backhaul link will remain high. These include, among others, transmitter power control, spatial beam coordination, sub-channel management (OFDMA), as well as null steering, coding (CDMA), link coordination, and fractional frequency re-use, which will be explained in detail below. It will be appreciated that the MAC processor performs all interference mechanisms, both in the feeder and in each link, in particular as defined in Applicant's co-pending patent application entitled: POINT-TO-POINT COMMUNICATION METHOD WITH INTERFERENCE MITIGATION.

Transmitter Power Control

Transmitter power control (TPC) is useful to permit reduction of the transmitter power, during backhaul transmission, to the minimum required in order for the receiver to receive the transmission with acceptable BER or BLER at the particular required CINR.

The power control process is divided into two main phases, the first carried out on the link level, to adjust the power control on each link, and the second carried out by the feeder to adjust the power control on each link, in order to reduce interference on other links.

Generally speaking, the first phase of TPC is providing a target CINR (which is configurable) for each node. During communication, each node measures the CINR in its receiver and reports to its remote node the CINR it measured. The actual measured CINR is compared to the target CINR, and the transmission power altered, if necessary, in an effort to move towards the target CINR.

The remote node will increase or decrease its transmission power, accordingly. As a consequence, the CINR in the near link will increase, decrease or remain without any change. This CINR will be reported to the remote node and it will decide to increase, decrease or maintain the transmission power, according to the CINR change. The remote node will increase its transmitter power only if the CINR increases after increasing the power. Otherwise, it will maintain or decrease the power. The decision to decrease or retain the power is dependent on the CINR change rate due to the power change—if no change in CINR occurs, the transmitter power remains constant.

In some cases, when there is a lot of interference over the link due to high power transmissions geographically close to the receiver, even increasing the power will not enable the receiver to receive the transmission. In such cases (i.e., where increasing the power does not improve the CINR), the lowest power that maintains the CINR unchanged is the optimal transmission power for the link under adjacent link conditions in the cluster.

Figure 21A:
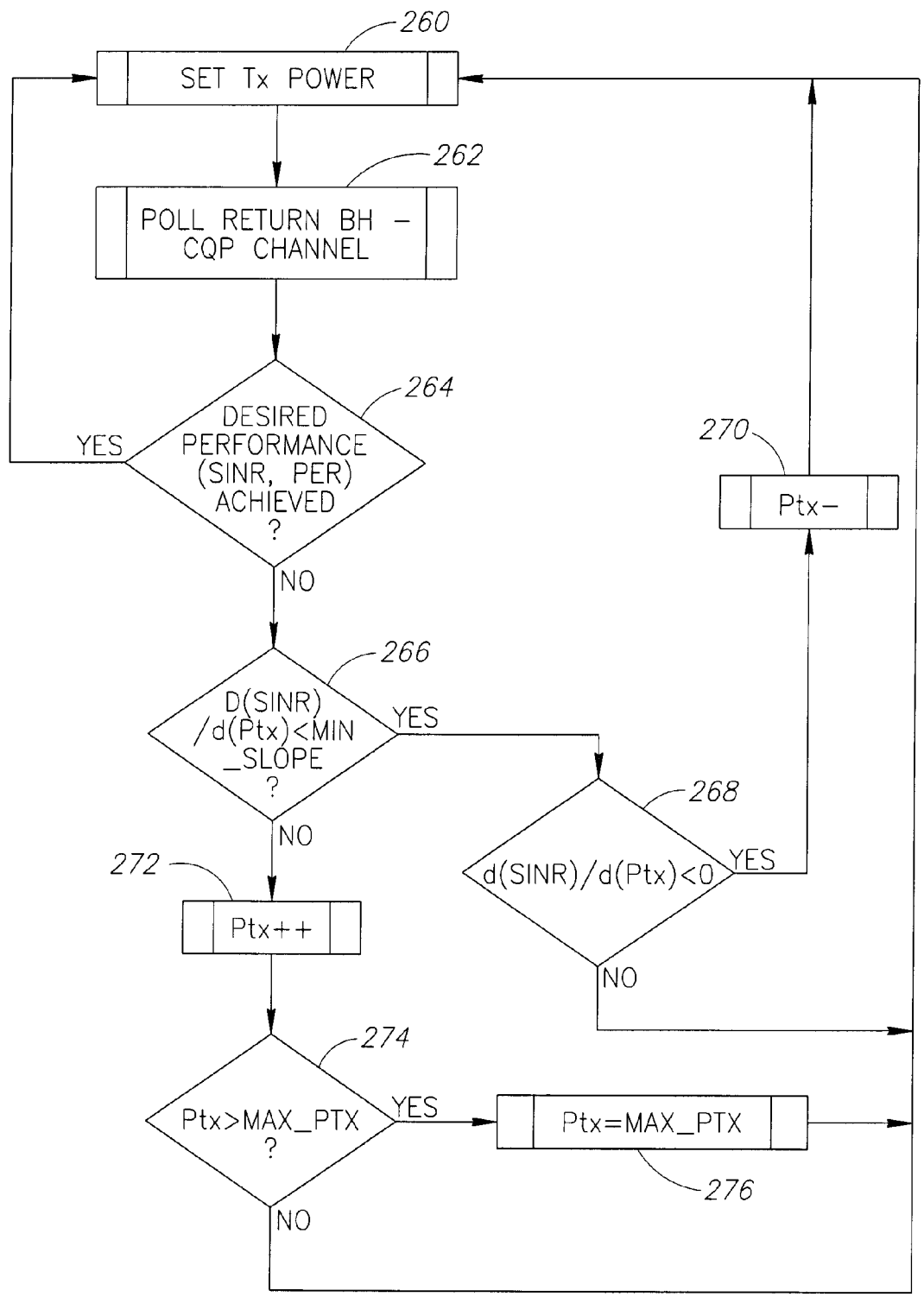
FIG. 21a is a flow chart illustrating transmitter power control, according to one embodiment of the invention.

Referring now to FIG. 21a, there is shown a flow chart of one method of setting the transmitter power in a certain link.

One link begins this process by setting an estimated Transmit power (block 260) which, in one embodiment, can be extracted from the Receive Signal Strength Indication (RSSI) on this link.

Then the transmitting node of the link polls feedback CQI (returning backhaul CQR) (block 262). In one embodiment, this is the CINR measured in the remote receiver on the communication link.

Figure 21B:
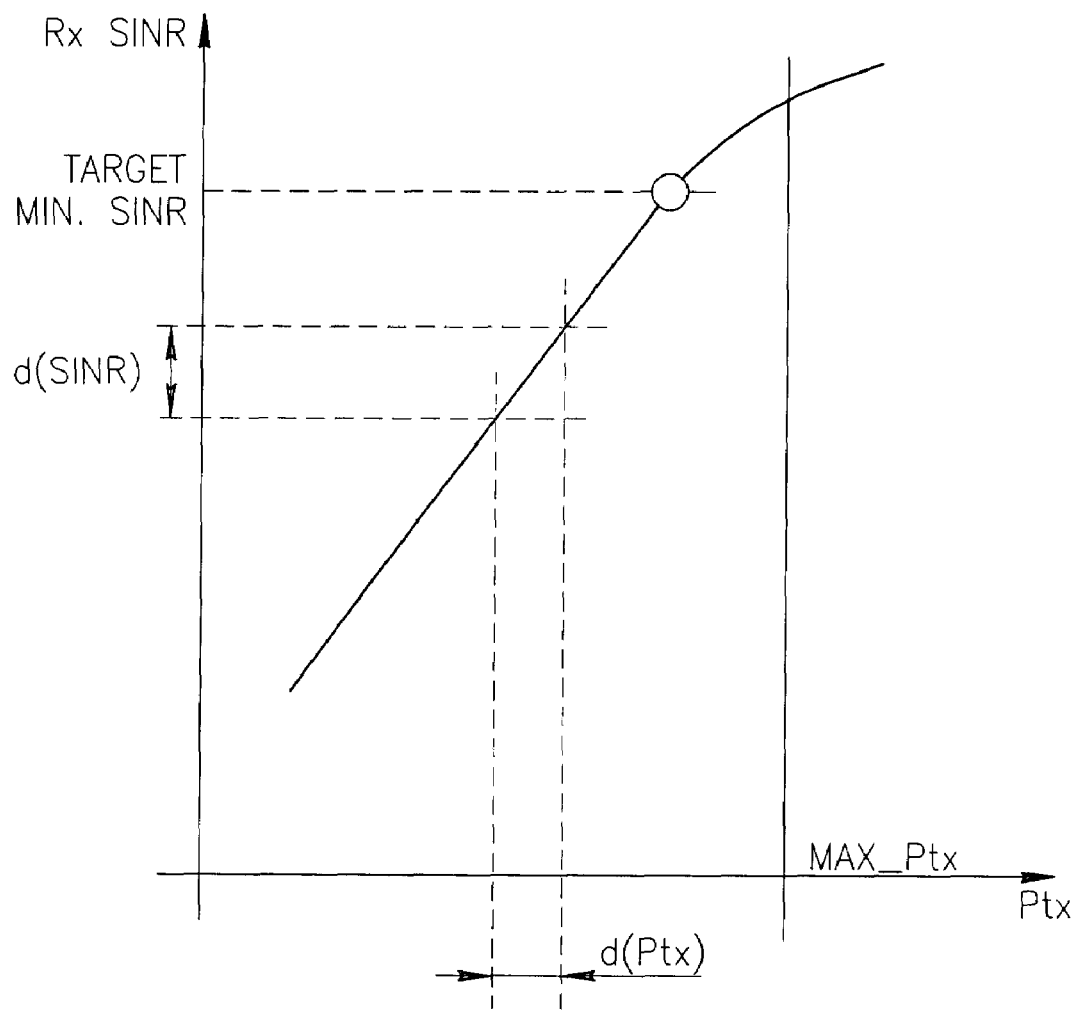

In case the required CINR is reached (block 264), the power is maintained and the link is periodically monitored to ensure maintenance of the CINR, preferably with a window of CINR—called "hysteresis" as known in the art In case the target CINR is not reached (is below the range) (block 264) the transmitter node will check the CINR gradient (change in CINR due to change in power) (block 266) experienced from the last transmission. This slope is illustrated graphically in FIG. 21*b*. In case this gradient is not positive (equal to or below zero) (block 268), the node will check if it is a negative CINR gradient, which means that adding power reduces the remote CINR, which can be caused due to power amplifier saturation. If so, it will reduce power (block 270) and repeat the whole process with the newly set transmitter power (block 260).

In case a zero gradient was experienced within the link, it means that adding power does not improve CINR. This indicates that no change in power should take place (there is no advantage to adding power, because the link is interference limited).

In case a positive CINR gradient is observed, which means that adding power in the transmitter increases the CINR at the remote receiver, further power can be added (block 272). If the CINR continues to increase, the power can be increased (block 274) until the maximum power is reached (block 276), or until the CINR no longer increases with increasing power.

This link level power control process is repeated periodically in order to track cluster and network interference changes. It will be appreciated that this process can be done relatively infrequently, so as to avoid frequent increases and decreases of transmission power over the links in the clusters.

After the first phase of transmitter power control is accomplished over each link in the cluster, the feeder node will begin a process of cluster-wise interference minimization.

Figures 22A, 22B:
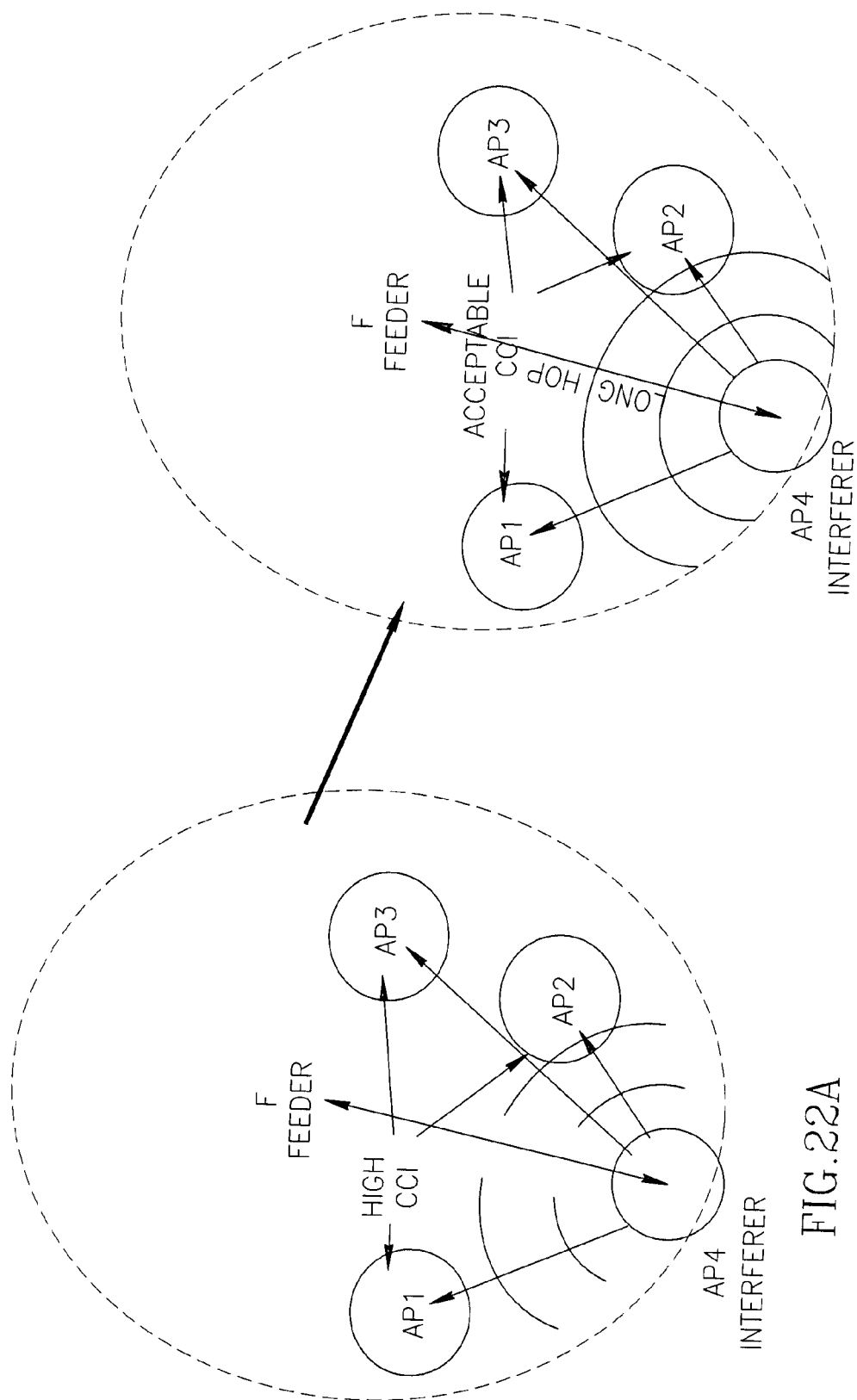
FIGS. 22a and 22b are schematic illustrations of transmission power control according to one embodiment of the invention.

The interference minimization mechanism for the cluster locates strong interferers within the cluster and acts to limit their transmitter power to minimize the interference they produce on other links throughout the cluster, as illustrated schematically in FIGS. 22*a* and 22*b*.

The process is managed by the feeder node and is described below:

The feeder node periodically polls every node within the cluster and requests an interference estimation of each node due to other nodes. Thus, in FIG. 22*a*, the feeder F requests SINR reports from the other four access points in the cluster, AP1, AP2, AP3 and AP4.

This data is analyzed, and the feeder node updates a cluster interference map, which includes cluster deployment topology and routes with their interference maps.

The feeder node monitors interference estimations on all the links and decides if interference above a pre-set threshold exists.

The feeder node analyzes the interference map to identify common interference source(s)—which are strong interferers affecting other "victim" links within the cluster. Thus, in the case illustrated in FIG. 22*a*, access point AP4 causes unacceptable interference in the other links in the cluster.

The feeder node orders the identified interferer to lower its Tx power, in an attempt to minimize intra-cluster interference. This process preferably includes choosing one victim link and trying to improve its SINR by reducing the TX power of the interferer. This process is carried out one by one, while each victim link's SINR is exercised by changing the TX power of each interferer, iteratively.

In this way, the transmitter power of the interferer AP4 is gradually reduced, while continuing to poll the "victim" access points' SINR, until an acceptable trade-off between the performance of all the access points is achieved, as shown, for example, in FIG. 22*b*. In this way, the overall performance in the link is optimized, as many gain performance at the expense of a single interferer.

It should be noted that a link which suffers from interference cannot be improved by increasing power to the link transmitter node, but only by reducing interfering transmission power over this link. Additionally, in this embodiment, it is also assumed that interference management can be done only within the cluster and not between clusters, due to lack of communication between clusters.

Sub-Channel Management

One preferred method of interference mitigation is sub-channel management, which permits allocation of a part of the frequency channel bandwidth to a certain backhaul link and a different part of the frequency channel bandwidth to other backhaul links. According to this mechanism, the high capacity point-to-point link utilizes adaptive 64-2048 OFDMA (orthogonal frequency division multiple access) transmission, which enables high granularity in bandwidth allocation to each link and modulation according to the channel conditions. According to the invention, OFDMA permits allocation of portions of time and frequency to different backhaul links. By dividing the channel into sub-channels by time and frequency, different links in the same geographical area can transmit at the same time over different frequency sub-channels, or over the same frequency sub-channels at a different time, without interfering with each other. Thus, both time and frequency diversity of the channels and frequency diversity gain are provided. This results in time and frequency granulation, which permits low penalty cost (in term of time/frequency resources), in case local frequency interference is detected.

Figure 10:
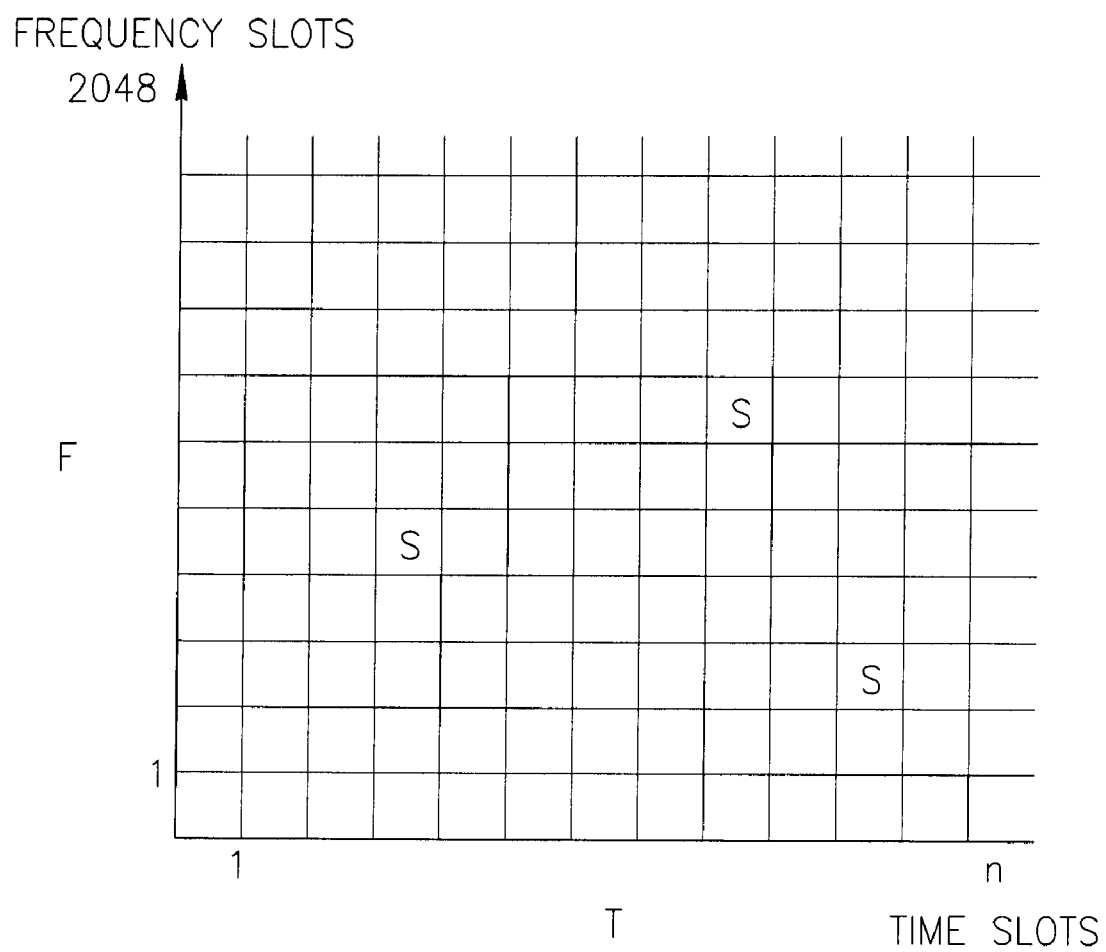
FIG. 10 is a graphical illustration of time and frequency allocation (OFDMA), according to one embodiment of the invention.

A time and frequency allocation plan according to one embodiment of the invention is illustrated schematically in FIG. 10. As can be seen, the available time T is divided into n time slots, while the frequency band F is divided into up to 2048 frequency slots. Each backhaul link is allocated one or several, contiguous or non-contiguous allocations of these time/frequency slots. In this OFDMA allocation scheme, different data can be loaded on each frequency/time slot (defined as bins), enabling full frequency and time diversity. In this way, source information can be dynamically transmitted over different sub-channels with different power levels, modulation and coding schemes, and at different time and frequency allocations on different MIMO streams on each backhaul link.

In one embodiment of the invention, each backhaul link can utilize a different part of the spectrum or time to communicate with its remote link. The process of selecting which band to utilize on each backhaul link can be carried out in a centralized fashion. For example, the feeder node, according to interference reported by each node in the cluster, can produce an interference map indicating the interference caused by each link on the other links, and can co-ordinate the spectrum such that a link which suffers from interference will operate on a different frequency slice concurrently, or on a different time slice over the whole spectrum.

Null Steering

Yet another mechanism is known as null steering. Null steering involves adjustment of the beam pattern whereby the spatial arrangement of the beam at least partially cancels the effect of transmission of a certain link in the direction of another link. This technique is known in the art and can be used together with, or instead of, alternative methods of interference mitigation described herein.

CDMA

Another method of minimizing interference in backhaul is encoding the transmission (CDMA). One suitable method is to allocate to each link a code from the family of Walsh-Hadamard codes, although any other CDMA code can, alternatively, be employed. By multiplying each link data symbol by one of the orthonormal codes (+/−1 value) of a Walsh sequence code from a family of Walsh-Hadamard codes, each link can transmit when it has data to transmit. The interference in demodulation of data from one link to another will be spread and flattened, which will make it easier to measure average burst interference over the whole demodulation period and provide better BER or BLER performance due to white noise.

The feeder node in each cluster allocates codes to each backhaul link in its cluster. Thus, a unique CDMA code is allocated to each backhaul link, such that better concurrent performance and interference flattening can be achieved within each cluster (or multiple cluster, in case coding is managed by the operator). It will be appreciated that this method can be used together with, or instead of, any other backhaul interference mitigation method.

Fractional Frequency Re-Use

The methods described above serve principally to reduce the interference within each cluster. However, it will be appreciated that interference between clusters can also pose a performance limitation. One method of interference mitigation that reduces both intra-cluster and inter-cluster interference is called fractional frequency division or re-use. It is important to note that this method can be utilized both in multiple access periods and in backhaul. In multiple access periods, it is used to increase the capacity within the cell, while in backhaul periods, it is utilized to reduce interference between clusters.

Figure 11A:
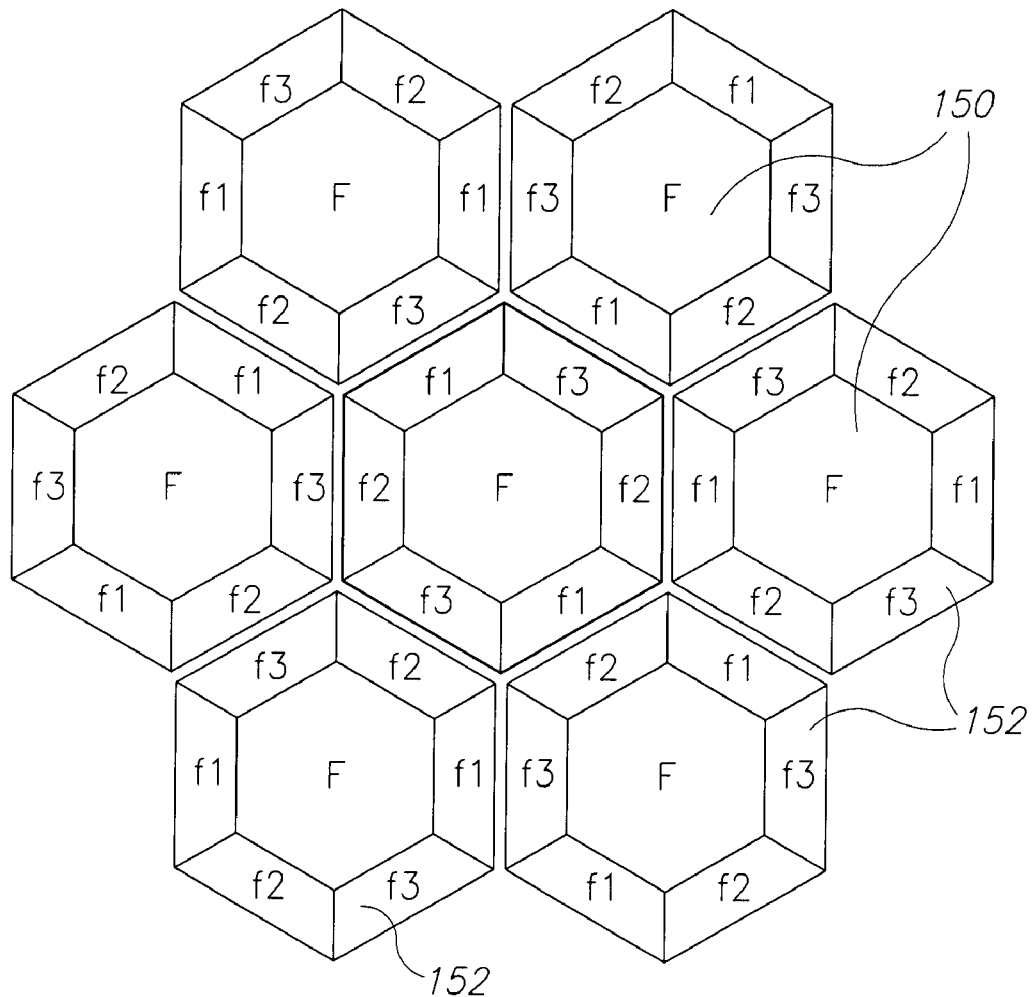
FIG. 11a is a schematic illustration of a fractional frequency re-use scheme, according to one embodiment of the invention.
Figure 11B:
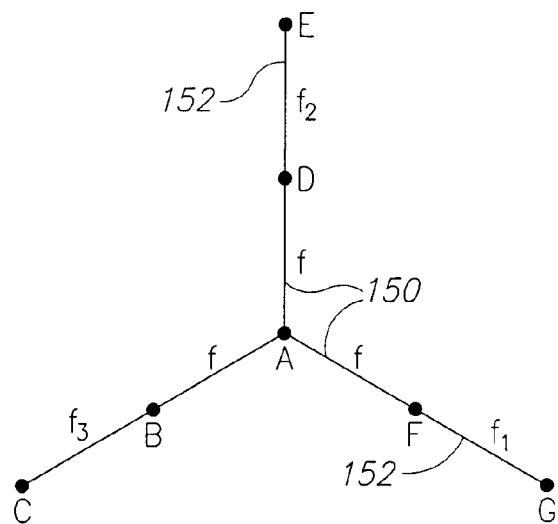

In the multiple access period, this frequency division method divides each cell into tiers, according to number of hops from the feeder, and then into sectors, as illustrated in FIGS. 11*a* and 11*b*. The sectors in the first tier 150 utilize a 1:1 re-use scheme, i.e., all transmit and receive on the same frequency range F (over the total spectrum), while the second tier is further divided into six sub-sectors 152, and utilizes a 1:3 re-use scheme, i.e., each sector transmits and receives on one third of the total frequency range, $f_1$, $f_2$ or $f_3$. In this approach, all cells allocate the significant part of their spectrum to the users that encounter good reception conditions, whereas the rest of the spectrum is allocated to the cell-edge users in a way that neighboring cells avoid sharing the same part of the spectrum in overlapping areas. This approach relies on feedback information from the users (e.g., based on path-loss, channel quality information or CINR estimate). It will be appreciated that in access, all nodes can transmit and receive concurrently.

In the backhaul period, the cluster is divided into tiers, according to number of hops from the feeder, as illustrated in FIG. 11*b*. The first hop is the first tier, which communicates in the backhaul period over a backhaul link with the first 3 access points around the feeder, and the second tier communicates with a relay along the route, over a different frequency, as described below.

Figure 11C:
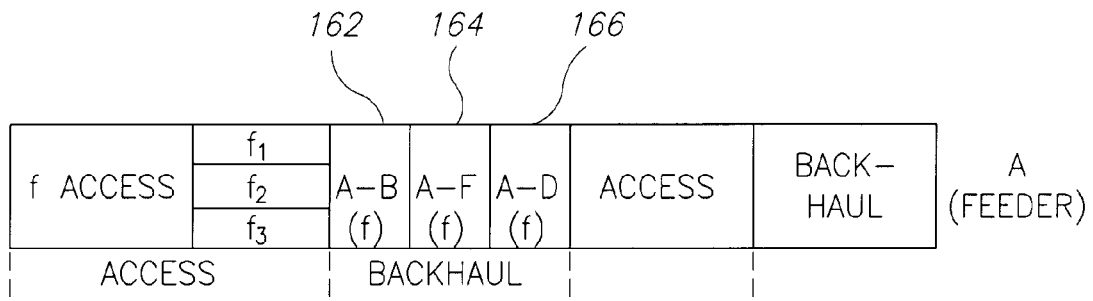
FIGS. 11c to 11g are schematic illustrations of time division among transmission frames in the cluster of FIG. 11b.
Figure 11D:
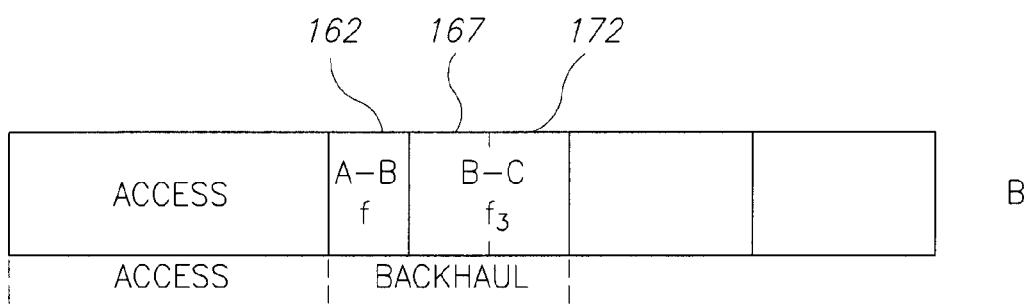

In backhaul, fractional frequency division substantially eliminates interference between clusters. An exemplary allocation is shown schematically in FIGS. 11*c-g*. Again, the relays B, D, F close to the feeder node A (the first hop, tier 1) communicate with the feeder A over the entire spectrum in TDMA. As shown in the exemplary frames in FIGS. 11*c-g*, each relay has a dedicated time slot for receiving (162 for B, 164 for F, and 166 for D) and for transmitting (not shown but completely symmetric) to the feeder A. The relays communicate with tier 2 (second hop nodes) C, E and G, during the full time slot on one third of the bandwidth (167 for B to C, 168 for D to E, and 169 for F to G) (FIGS. 11*c*, 11*d*, 11*g*).

Figure 11E:
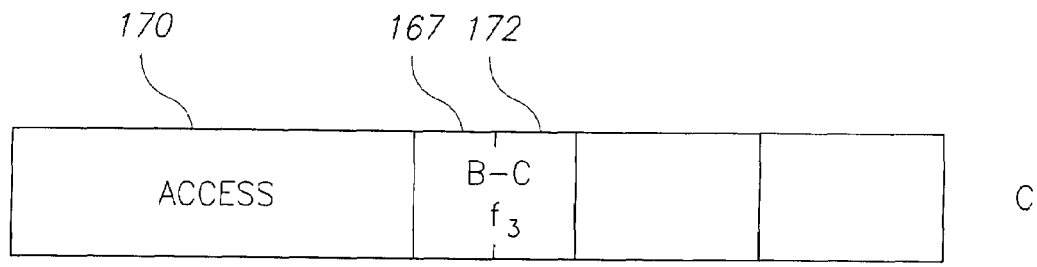
Figure 11F:
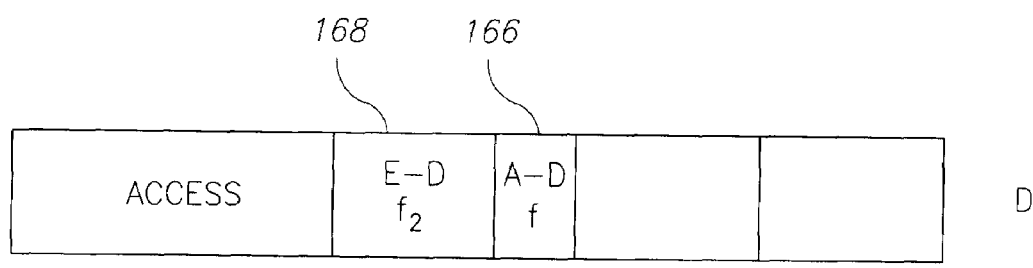
Figure 11G:
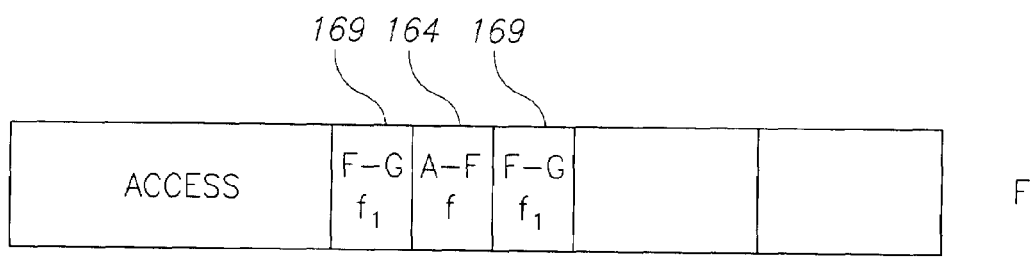

Each second tier node C, E and G, has enlarged access time 170, shown in FIG. 11*e* for node C. In addition, it will be appreciated that communication between the relays and second tier nodes will not dramatically degrade backhaul performance, even though only transmitting over one third the bandwidth. This is because each relay can communicate with its tier 2 node during two time slots of the first tier nodes' communication with the feeder (167 and 172 in FIGS. 11*d* and 11*e*), when each of the relays on a different path to the feeder communicates with the feeder. Furthermore, each of those time slots is longer than its own backhaul time slots 167, because the relay nodes must have time to relay traffic to and from their own mobile stations, as well as to transmit aggregated traffic to and from the tier 2 node. Thus, in the overall process, when a relay node (an access point in the middle of a route) is not communicating with the feeder in the backhaul period, it can provide additional communication time to the tier 2 access point.

It will be appreciated that, in multi-hop embodiments, there can be more than 2 tiers. In this case, all except the outermost tier will utilize frequency re-use 1:1 and only the outermost tier, which is closest to adjacent clusters, will utilize frequency re-use 1:3, i.e., transmitting over $f_1$, $f_2$ or $f_3$. In addition, in other embodiments, backhaul sectorization can be to more than three sub-channels, even though access is limited to three by accepted IEEE 802.16e standards.

It will be appreciated that the fractional frequency re-use mechanism, in both access and backhaul, is an optional mechanism, which the operator can choose to operate or not, and will not impact any other mechanism described herein.

SDMA

Once the access points are connected to one another and routes have been selected, the feeder node has a choice of two modes of operation in backhaul—MIMO for point-to-point operation, or SDMA for point to multi-point operation, as defined by the operator.

Figure 12B:
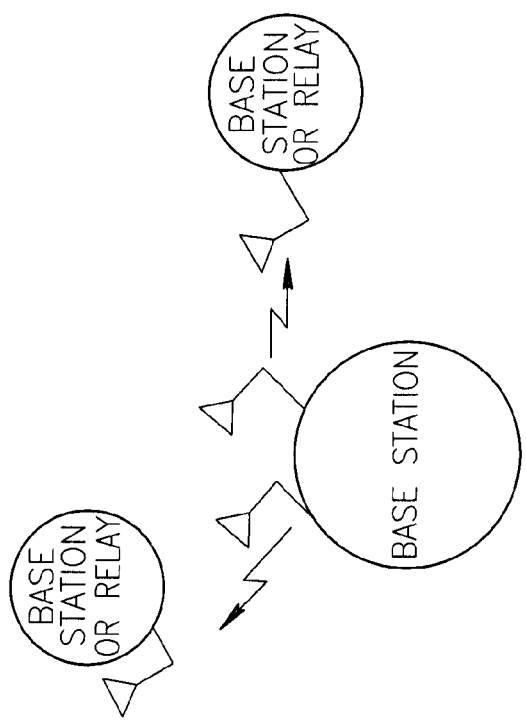
FIGS. 12a and 12b are schematic illustrations of a MIMO configuration and a SDMA configuration, respectively, according to one embodiment of the invention.
Figure 12A:
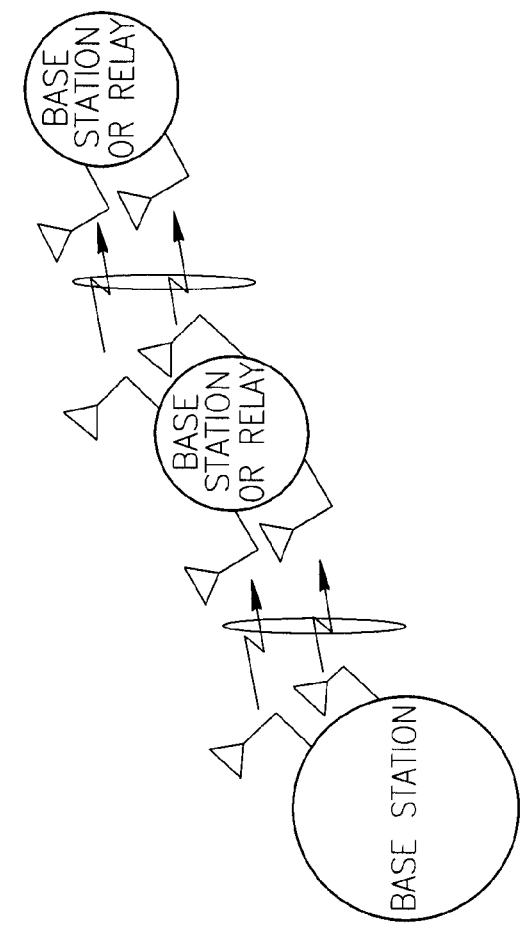
Figure 13A:
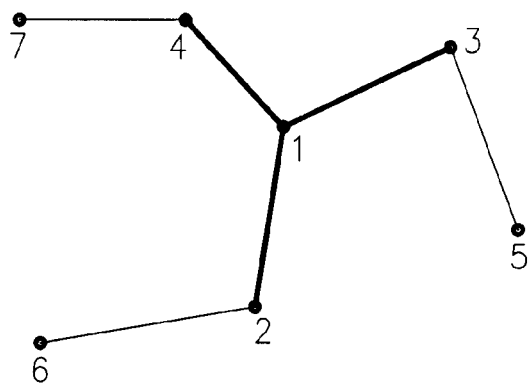
FIGS. 13a and 13b are schematic illustrations of transmissions at different times on an SDMA configuration, according to one embodiment of the invention.
Figure 13B:
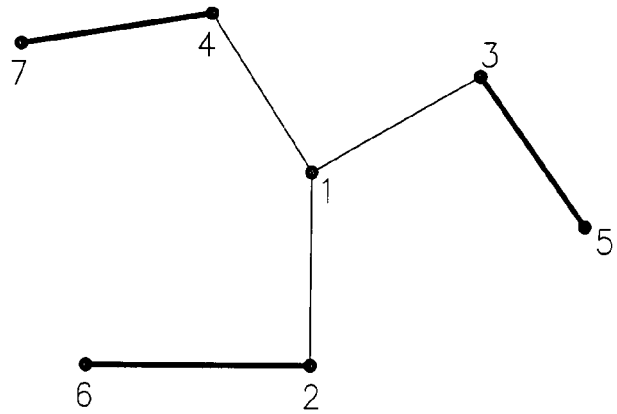
Figure 13C:
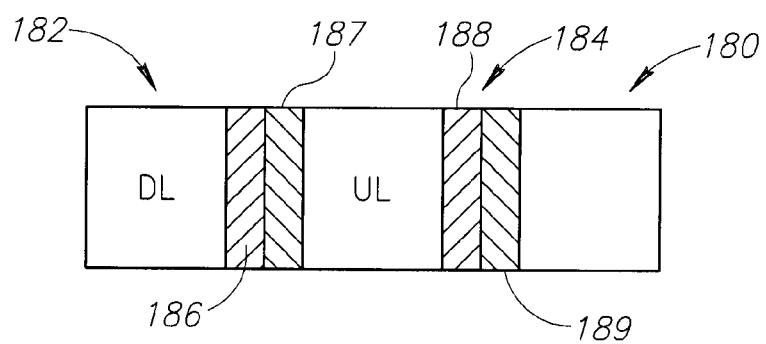

MIMO operation has been described above. A schematic illustration of the difference between multi-stream MIMO and SDMA communication is shown in FIGS. 12*a* and 12*b*. SDMA in backhaul involves concurrent point to multi-point transmissions between the feeder node and the other nodes (access point, base station, relays, etc.) in the cluster, the group changing depending on the time slot, as shown in FIGS. 13*a* and 13*b*. A sample frame for SDMA mode is illustrated schematically in FIG. 13*c*. As can be seen, frame 180 includes a downlink portion 182 and an uplink portion 184. In the downlink portion, a segment 186 is allocated for simultaneous point to multi-point transmission, on the same frequency, from the feeder node 1 to access points 2, 3 and 4 which are defined as tier 1 (see FIG. 13*a*), and a segment 187 is allocated for simultaneous multiple transmission on the secondary hop access points, from 2 to 6, 3 to 5, and 4 to 7, which are defined as tier 2 (see FIG. 13*a*). Similarly, on the uplink portion, a segment 188 is allocated for multi-point transmission to the feeder node 1 from access points 2, 3 and 4, and a segment 189 is allocated for multiple transmissions on the secondary hop access points, from 6 to 2, 5 to 3, and 7 to 4. Checks will be made by each access point to ensure that there is minimal interference with surrounding access points, employing interference mitigation, as required. Thus, the SDMA algorithm running in the feeder node permits multiple access points to communicate simultaneously with the feeder, while canceling interference between them, as by smart antenna techniques known in art. It will be appreciated that SDMA can also be used in access, if desired.

Radio Resources Re-Use

According to one preferred embodiment of the present invention, the nodes according to the invention can take advantage of radio resources re-use, a method of providing spatial interference mitigation, due to the fact that the feeder node within each cluster is aware of the interference on each backhaul link in its cluster. Thus, geographically separated backhaul links can use the same radio resources, at the same time, for concurrent backhaul transmissions on the same radio frequency channel (slice), without creating interference, even without requiring coding or other interference management methods. This is made possible by the following four characteristics of this embodiment: that the links are geographically separated; that beam forming is used to provide directional beams (60° or 120°, depending on the antenna configuration); that the feeder centrally manages the cluster and is aware at any given time of the total interference acting on the various links; and due to the typical deployment below roof-top level, resulting in isolation due to building penetration between access points (or relays). In this way, the level of interference between links far away on different roads will be lower, on average, than in the case of transmission above roof level. Furthermore, the network enjoys improved capacity: multiple transmissions provide multiplexing gain, which increases capacity by several factors.

The frame structure of the communication channel between base station and mobile station and between base station and base station can be divided in the time domain. One example is illustrated schematically in FIG. 14a. During each of three time slots T1, T2, T3, a feeder node A, coupled to a core network, communicates over a link with one of the access points B1, B3, B5, each of which communicates with one or more mobile stations. At the same time, one of the second hop (tier 2) access points B4, B2, B6, which communicates with the feeder node A through another access point, can communicate with its adjacent access point. In the example of FIG. 14a, B5 communicates with B4, at the same time as A communicates with B1, during time T1. This is possible due to the network characteristics set forth above, so that little or no interference is measured in the coupling of these two links.

Figure 14B:
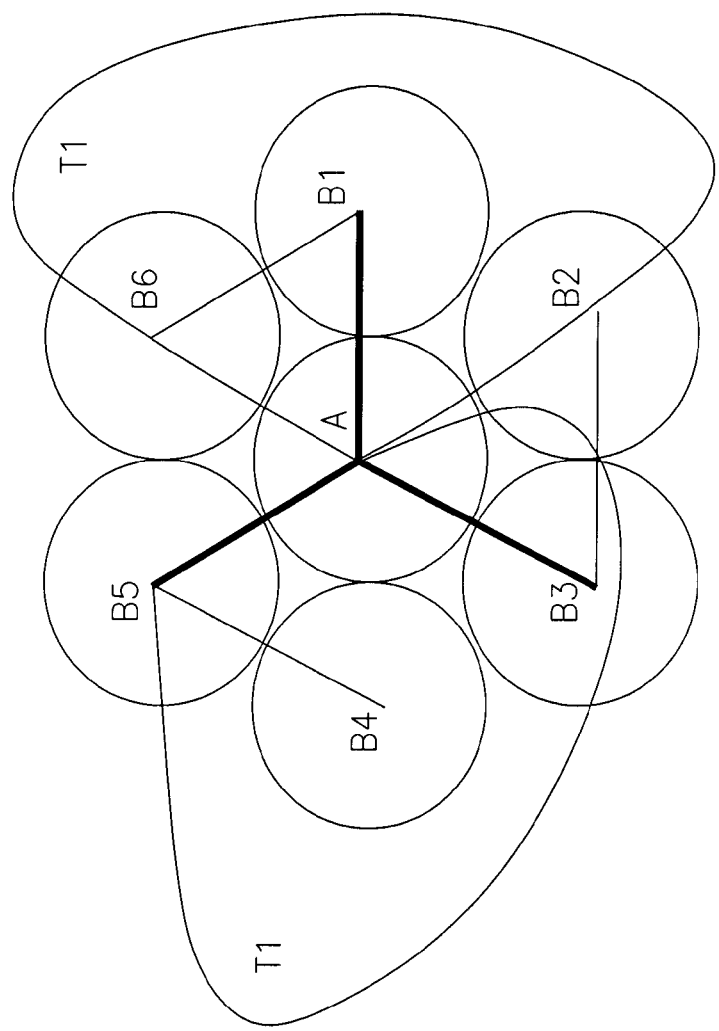
Figure 14A:
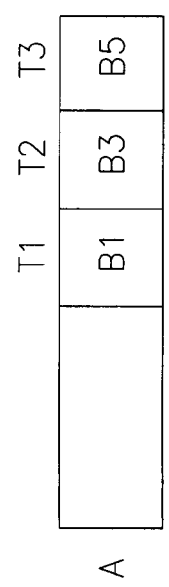
FIG. 14a illustrates a time division frame arrangement using a spatial interference mitigation scheme for an access point, according to one embodiment of the invention.
Figure 15A:
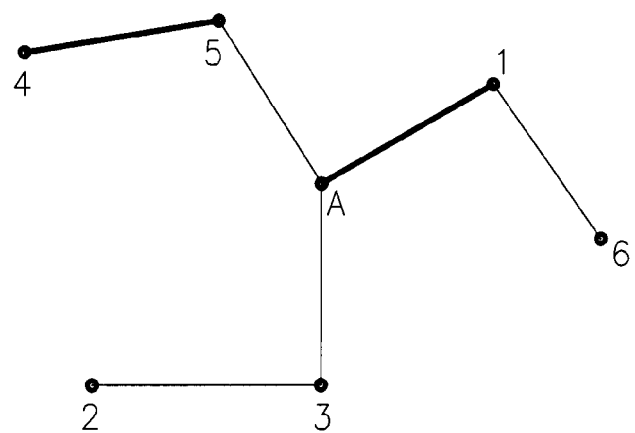
Figure 15B:
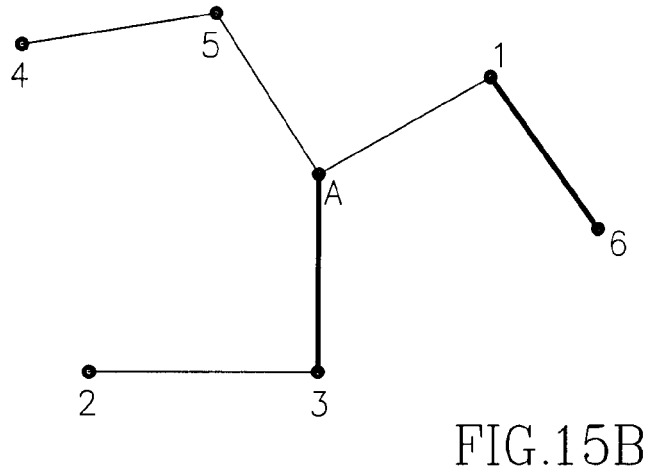
Figure 15C:
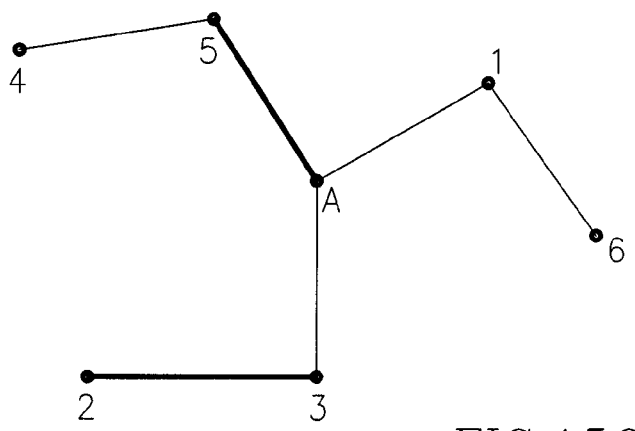

As can be seen schematically in FIG. 14b, beam forming has provided two substantially triangular coverage areas during time T1, which substantially do not interfere with one another. The groups of links having transmission at any given time can change, as set forth in FIG. 14a and illustrated schematically, as an additional example, in FIGS. 15a, 15b and 15c, the highlighted links being operative concurrently. In FIG. 15a, PTP (Point to Point backhauling) transmission is illustrated as occurring concurrently between feeder node A and relay 1, and between access points 5 and 4. During a different time slot, as shown in FIG. 15b, PTP transmission occurs concurrently between feeder A and relay 3, and between access points 1 and 6, and during a third time slot, as shown in FIG. 15c, PTP transmission occurs concurrently between feeder A and relay 5, and between access points 3 and 2. This occurs due to the fact that these backhaul links are geographically separated, etc., as set forth above. Thus, they can fully reuse the radio resources in each time slot.

Figure 16:
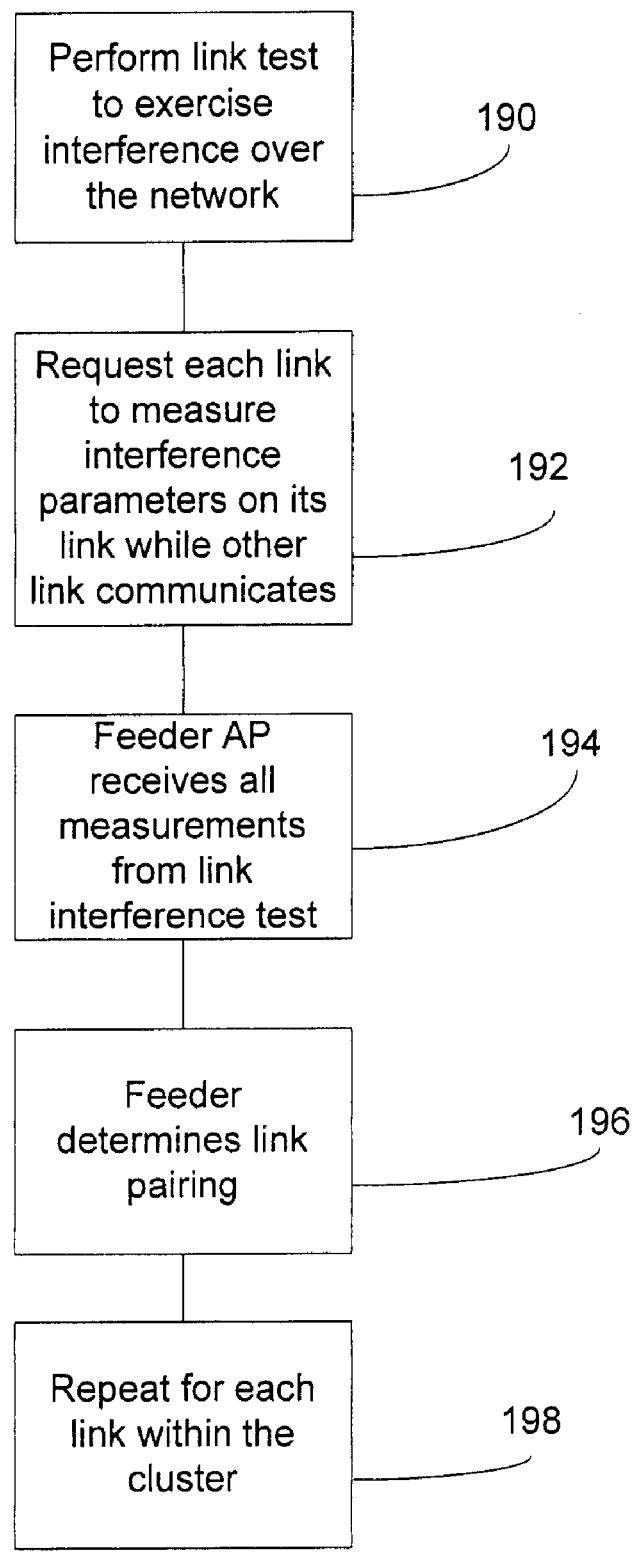
FIG. 16 is a flow chart illustrating radio resource re-use management, according to one embodiment of the invention.

The feeder access point is responsible for the allocation of radio resources among all the access points in its cluster. A suitable software algorithm permits the feeder to perform this allocation. A flow chart of one example of a suitable protocol for such radio resources re-use is shown in FIG. 16. First, a link test is performed on one backhaul link in the cluster, while all the links in the cluster are working, to permit measurement of the interference over that link (block 190). For purposes of the test, each link in the cluster is requested to measure pre-selected link characteristics during transmission/reception by the tested link, for example, interference parameters, CINR, SNR, BER or BLER (block 192). The results of these measurements are sent to the associated feeder node in the cluster (block 194). Based on these results, in accordance with pre-defined rules, a software algorithm running in the feeder determines the optimum link pairing (block 196) under the present network link conditions (i.e., which link transmits together with which other link), changing the current arrangement as necessary. This procedure is repeated for each link within the cluster (block 198). Alternatively, the feeder can request operation of certain links in the cluster, while measuring on one or more links, in order to determine the optimum link pairing. Based upon the results, the feeder may determine that an access point should be reconnected in a different manner to the feeder and/or may provide a different route for one or more access points in order to maximize capacity due to this radio resources re-use.

In one embodiment of the invention, multiple access transmission can occur concurrently with backhauling transmission on access points which are not participating in the backhauling transmission at a certain time. This is accomplished by utilizing a beam forming antenna in the backhauling process, which will strongly attenuate access transmission interference due to about 15 db front back attenuation and geographical separation of access points transmitting access from the backhaul transmission. In another embodiment, while a backhauling transmission takes place, no multiple access occurs within the cluster. This will completely eliminate access-to-backhaul interference but at the cost of total cluster throughput, since less time is available for access.

Due to the high efficiency of the backhaul network, performing ultra-high capacity interconnection links with guaranteed rate and low latency connections, the overall network performance of the Micro/Pico-cell based WiMAX network is much higher than that of the traditional Macro-cell based WiMAX network. For example, comparing a typical Micro/Pico-cell network to a Macro-cell network, in terms of total capacity in a certain coverage area (total capacity in Mbps per Square-mile), can result in about 5 times higher capacity with the Micro/Pico-cell based network.

Figure 23B:
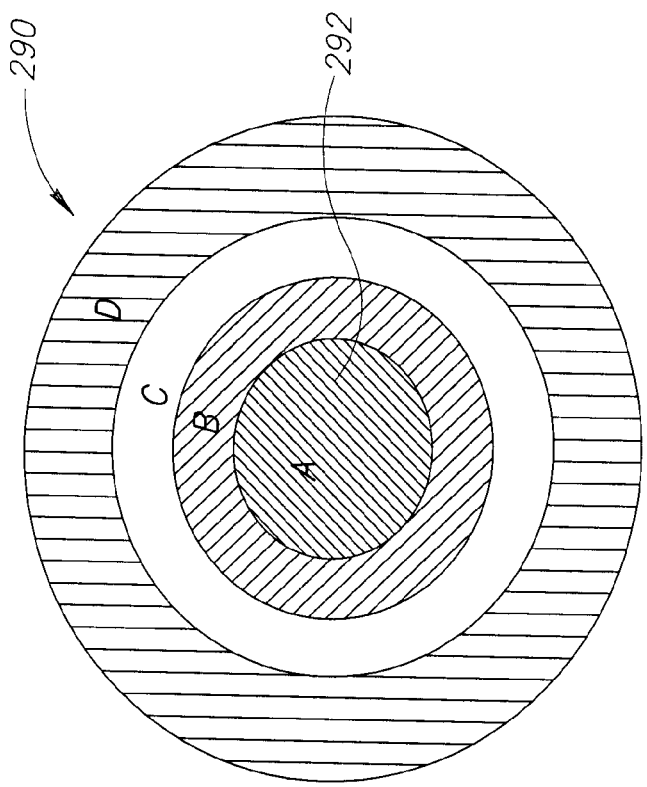
FIG. 23b is a schematic illustration of the capacity distribution of a conventional WiMAX network.
Figure 23A:
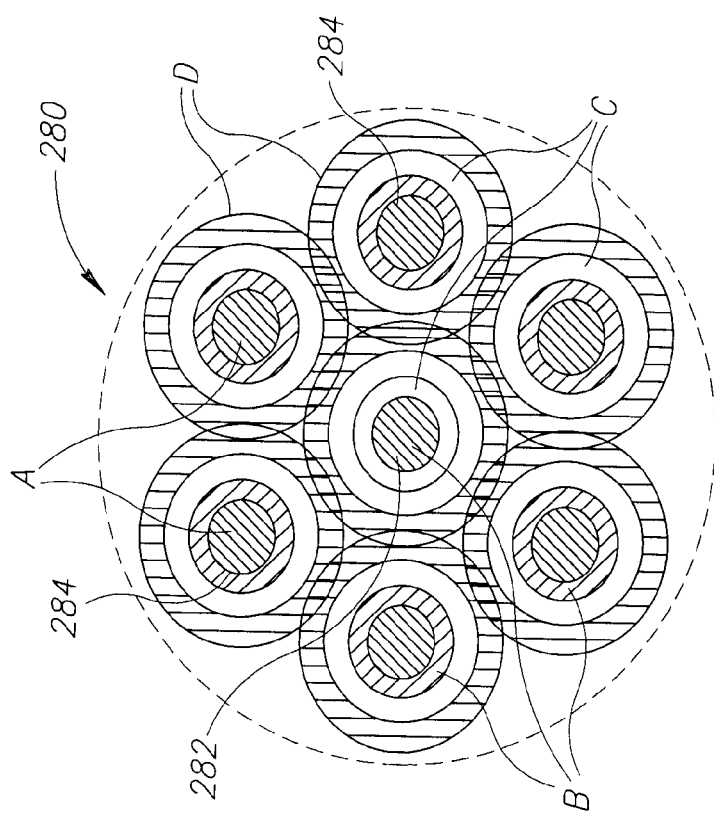
FIG. 23a is a schematic illustration of the capacity distribution of a WiMAX cluster according to one embodiment of the invention.

This comparative capacity is illustrated schematically in FIGS. 23a and 23b, showing, respectively, a cluster 280 in a WiMAX network according to an embodiment of the present invention, and a cell 290 (of comparable size) of a conventional WiMAX network. The circles (A, B, C, D) around each node represent areas of gradually reduced capacity. As indicated, the capacity of the feeder 282 (or of a relay in a cluster) is lower than that of the nodes 284 coupled to it. As can be seen, the capacity distribution around each node (except the feeder) is substantially the same as that around the base station 292 in cell 290, as illustrated in FIG. 23b. However, the peak rate of mobile stations within the cluster area 280 is dispersed over the coverage area of the cluster, providing more homogeneous capacity distribution than that provided in cell 290 in macro-cell deployment. Furthermore, there are larger areas with much lower overall capacity D in the macro-cell deployment scheme than in the micro-cell deployment of the present invention.

It is a particular feature of the invention that a wireless network according to the present invention has standard compliancy in the air interface between mobile stations and access points, and all processes are completely transparent to the air interface, as defined by IEEE 802.16e.

A network according to the invention provides advantages over conventional WiMAX solutions. Mobile operators are expected to deploy WiMAX as an overlay to their UMTS/HSDPA deployment, providing high capacity data services with WiMAX and competing with fixed carriers having a broadband mobile offering. With the availability of WiMAX access point units according to the invention, the overlay becomes simple and inexpensive. Installing a low-cost, single box WiMAX access point unit over existing sites (towers), results in extensive broadband WiMAX coverage. Deployment extension for extra coverage and capacity requirements would be performed using Micro/Pico-cell WiMAX access point units, installed on street-poles and in indoor locations.

An additional advantage of utilizing a low-cost and easy to install access point unit is that it provides the operator with the means to easily enhance the network capacity as required, by installing additional access point units in the network. With the increasing number of subscribers, and the increasing capacity per subscriber, the ability to easily install additional access point units in the network is advantageous.

It will be appreciated that, due to the lower power required for transmission across micro/pico cells, the network of the present invention provides safety and poses less of a RF radiation threat than do conventional systems, due to the smaller quantity of radiation generated by them than in conventional antenna arrangements.

With a software upgrade to the unit, an access point can also serve as a "relay station" proposed in the WiMAX Mobile Multi hop Relay standardization, by implementing the standard interface to the Macro Base Station.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A mobile broadband wireless communication network comprising:
   a plurality of mobile broadband wireless nodes deployed in micro or pico cells for providing wireless access service over a channel band to a plurality of mobile terminals;
   a plurality of said nodes being wirelessly coupled in a cluster;
   one of said nodes in each said cluster being a feeder node coupled to a core network;
   said nodes in each said cluster being linked in a tree or multi-hop topology to said feeder node;
   each of said nodes including means for performing wireless backhaul to said feeder node on said channel band.

2. The network according to claim 1, wherein said means for performing includes a point to point backhaul network permitting in-band wireless communication between said nodes in said cluster.

3. The network according to claim 2, wherein said backhaul network includes means for implementing at least one interference mitigation technique to reduce interference during wireless backhaul transmissions.

4. The network according to claim 1, wherein each said node includes:
   a transceiver with associated modem;
   an antenna arrangement coupled to said modem and arranged for multiple concurrent transmissions;
   a Media Access Control (MAC) controller for controlling said transceiver, modem and antenna arrangement, and means for both access and backhaul communication.

5. The network according to claim 4, wherein said transceiver, antenna arrangement and MAC controller provide both access communication and a wireless point to point backhaul network permitting wireless communication between said nodes in said cluster.

6. The network according to claim 5, wherein said transceiver is a "terminal Radio Frequency-Integrated Chip (RF-IC)" module.

7. The network according to claim 5, wherein said antenna arrangement includes a plurality of directional antennas for access and backhaul transmissions.

8. The network according to claim 5, wherein said antenna arrangement includes a plurality of omni-directional antennas, and said MAC controller includes smart antenna logic for beam-forming using said omni-directional antennas for access and backhaul transmissions.

9. The network according to claim 5, wherein said backhaul network is an in-band, point to point backhaul network managed by said MAC controller.

10. The network according to claim 9, wherein said backhaul network includes means in said MAC controller for implementing at least one interference mitigation technique to reduce interference during transmissions.

11. The network according to claim 10, wherein said means for implementing includes means for controlling transmitter power in response to link conditions for access and backhaul transmissions.

12. The network according to claim 11, wherein said means for controlling includes means in one node for iteratively adjusting transmitter power in another node to which it is linked, in order to approach a pre-defined target Carrier to Interference and Noise Ratio (CINR in said one node).

13. The network according to claim 12, further comprising means for adjusting transmitter power in a node which is interfering with a plurality of other nodes in said cluster until said interference is reduced.

14. The network according to claim 13, wherein said means for adjusting includes:
   means in each node for determining interference caused by other nodes in said cluster and providing an output signal corresponding thereto;
   means in said feeder for polling said plurality of nodes in said cluster to receive said output signals;
   means in said feeder for determining, from said received output signals, which node is causing interference to a plurality of other nodes in said cluster; and
   means for instructing said interfering node to reduce transmission power.

15. The network according to claim 10, wherein said means for implementing includes means for implementing null steering of transmission beams.

16. The network according to claim 10, wherein said means for implementing includes means for encoding each concurrent transmission with a different CDMA (Code Division Multiple Access) code.

17. The network according to claim 16, wherein said CDMA code includes a code from a Walsh-Hadamard family of codes.

18. The network according to claim 10, wherein said means for implementing includes means utilizing Orthogonal Frequency Division Multiple Access (OFDMA) for sub channel management.

19. The network according to claim 18, wherein said means for sub-channel management includes:

means for allocating at least one time and frequency slot from an OFDMA time/frequency map to each concurrent transmission; and
means for mapping each said transmission to its allocated slot.

20. The network according to claim 10, wherein said means for implementing includes means for implementing spatial beam coordination.

21. The network according to claim 10, wherein said means for implementing includes means for implementing a fractional frequency re-use scheme in said backhaul network.

22. The network according to claim 21, wherein said means for implementing said scheme includes:
software means for dividing the cluster into at least two tiers of links, according to a number of hops from the feeder; and
software means for enabling concurrent communication over one third of an available frequency band on adjacent links in an outermost of said tiers; and
software means for enabling communication on all of said available frequency band on links within all other said tiers.

23. The network according to claim 5, further comprising:
means for creating sectorization of transmission from each said node for concurrent transmission in three directions over one third of available bandwidth in backhaul transmissions.

24. The network according to claim 23, wherein:
said antenna arrangement includes three directional antennas; and
said means for creating sectorization includes means for mounting said antennas such that each antenna is aimed in a different direction.

25. The network according to claim 23, wherein:
said antenna arrangement includes a plurality of omni-directional antennas; and
said means for creating sectorization includes means for implementing beam forming techniques to shape form several beams, each said beam comprising transmissions from a selected group of antennas directed to a selected sector.

26. The network according to claim 25, wherein said antenna arrangement includes six omni-directional antennas arranged in a circle.

27. The network according to claim 25, wherein said antenna arrangement includes nine omni-directional antennas.

28. The network according to claim 25, wherein said antenna arrangement includes twelve omni-directional antennas.

29. The network according to claim 25, wherein said antenna arrangement includes six omni-directional antennas arranged in two geographically separated triplets, for communication over three sectors of 120° each.

30. The network according to claim 25, wherein said antenna arrangement includes six omni-directional antennas arranged in two sets of triplets, further comprising means for polarization of electromagnetic fields of said antennas, such that each stream has a different polarization, to enable concurrent transmission of three MIMO (Multiple In/Multiple Out) streams.

31. The network according to claim 5, wherein said backhaul communication is in-band backhaul, said transmission being divided into a plurality of transmission frames, each transmission frame including an access time slot and a backhaul time slot.

32. The network according to claim 31, further comprising a frame builder in each node, said frame builder being driven by said MAC controller to insert access bursts into each transmission frame for transmission during an access time slot, and backhaul data into each transmission frame for transmission during a backhaul time slot.

33. The network according to claim 32, wherein said MAC controller drives said frame builder to fill each frame with transmission slots of access adjacent transmission slots of backhaul, and reception slots of access adjacent reception slots of backhaul.

34. The network according to claim 5, wherein said MAC controller further comprises software means for implementing radio resources reuse, whereby geographically separated backhaul links in a cluster transmit over a same radio frequency range, at a same time, for concurrent backhaul transmissions on a single radio frequency channel, substantially without creating interference.

35. The network according to claim 34, wherein:
directional beams are provided from each node;
said feeder includes means for receiving interference measurements from said links and means for centrally managing said cluster in accordance with said interference measurements; and
said nodes are deployed below roof-top level.

36. The network according to claim 5, further comprising means for allocating 1, 2 or 3 MIMO (Multiple In/Multiple Out) streams to different antennas in said antenna arrangement for backhaul point to point communication between nodes in a link adaptively, in accordance with link conditions.

37. The network according to claim 36, further comprising means for adaptive allocation of modulation and coding in said backhaul communication.

38. The network according to claim 5, further comprising means for enabling one node, in backhaul, to communicate concurrently with multiple nodes in a single frequency band using SDMA (Space Division Multiple Access) wherein transmissions are separated by different, spatially separated beam allocations, created by geographic separation in deployment.

39. A mobile broadband wireless communication network comprising:
a plurality of mobile broadband wireless nodes deployed in micro or pico cells for providing wireless access service to a plurality of mobile terminals over a channel band;
a plurality of said nodes being grouped in a cluster;
one of said nodes in each said cluster being a feeder node coupled to a core network;
each of said nodes including means for performing wireless backhaul to said feeder node on said channel band;
said nodes in each said cluster being linked in a tree topology to said feeder node;
each said node comprising:
a housing;
a plurality of omni-directional antennas mounted on said housing for access and backhaul transmissions;
a plurality of transceivers mounted in said housing, each said transceiver having an associated modem and being coupled to one of said antennas; and
a chip including:
a Media Access Control (MAC) processor which directs and coordinates operation of all other elements in the node;
a packet processor coupled to an inlet of said MAC processor for providing packets with air interface attributes to said modem;

a routing table in said MAC processor for routing packets passing therethrough;

a burst modulator coupled to said MAC processor for producing symbol bursts from a plurality of packets having at least some common air interface attributes, a burst being produced for each sector over which said node is transmitting;

a symbol builder coupled to said burst modulator for receiving said symbol bursts and building an OFDM (Orthogonal Frequency Division Multiplexing) symbol according to a number of streams, sectors and antenna technique for transmitting each burst, and mapping each burst's symbols to frequency and time slots into an Orthogonal Frequency Division Multiple Access (OFDMA) time/frequency map;

a MIMO (Multiple In/Multiple Out) processing and beam forming module coupled to said symbol builder for receiving said mapped OFDMA symbols and processing signals related to multiple input-multiple output communication; and a transmitter front-end module coupled to said MIMO processing and beam forming module for transmitting said OFDMA signals via a transceiver and associated antenna arrangement.

40. The network according to claim 39, wherein said packet processor includes means for monitoring, counting, and enqueuing all incoming and outgoing data packets according to a set of QoS (Quality of Service) classifiers, and a storage element for storing said enqueued packets until transmission.

41. The network according to claim 39, further comprising:
a receiver front end module for receiving OFDMA signals transmitted to it and performing inverse operations of said transmitter front end module for both said access and said backhaul transmissions;

a multi-antenna synchronization module coupled to said receiver front end module for processing said received OFDMA signals;

a MIMO and beam forming receiver module coupled to said synchronization module for implementing an interference cancellation algorithm between multiple streams received from said antenna arrangement;

a symbol de-builder coupled to said MIMO and beam forming receiver module for de-mapping groups of OFDMA symbols in time and frequency, to a set of bursts (in access), as defined by said MAC processor;

a high speed burst demodulator coupled to said symbol de-builder for processing said bursts to data packets which are sent to said MAC processor for further processing.

42. A method of mobile broadband wireless communication comprising:
deploying a plurality of mobile broadband wireless nodes in micro or pico cells for providing wireless access service to a plurality of mobile terminals;
grouping a plurality of said nodes in a cluster;
coupling one of said nodes in each said cluster to a core network to serve as a feeder node;
linking said nodes in each said cluster in a tree topology to said feeder node; and
performing wireless backhaul between each of said nodes and said feeder node on said channel band.

43. The method according to claim 42, further comprising providing a wireless point to point backhaul network for communication between said nodes in said cluster.

44. The method according to claim 42, wherein said step of performing wireless backhaul includes implementing at least one interference mitigation technique to reduce interference during transmissions.

45. The method according to claim 42, further comprising:
forming each said node from:
a transceiver with associated modem; and
an antenna arrangement coupled to said modem and arranged for multiple concurrent access and backhaul transmissions; and
providing a Media Access Control MAC controller in each node for controlling said transceiver, modem and antenna arrangement to perform both access and backhaul communication.

46. The method according to claim 45, further comprising providing a wireless point to point backhaul network for communication between said nodes in said cluster.

47. The method according to claim 45, wherein said step of forming includes forming said node from a terminal Radio Frequency-Integrated Chip (RF-IC) module radio transceiver with power amplifier.

48. The method according to claim 46, wherein said step of forming includes forming said node from an antenna arrangement including a plurality of directional antennas for both said wireless access and said wireless backhaul communication.

49. The method according to claim 46, wherein said step of forming includes forming said node from an antenna arrangement including a plurality of omni-directional antennas, and providing said MAC controller with smart antenna logic for beam-forming using said omni-directional antennas for both said wireless access and said wireless backhaul communication.

50. The method according to claim 46, wherein said step of providing a backhaul network includes providing an in-band, point to point backhaul network managed by said MAC controller.

51. The method according to claim 50, further comprising implementing in said MAC controller at least one interference mitigation technique to reduce interference during wireless backhaul transmissions.

52. The method according to claim 51, wherein said step of implementing includes controlling transmitter power in response to link conditions.

53. The method according to claim 52, wherein said step of controlling includes iteratively adjusting transmitter power in another node to which one node is linked, in order to approach a pre-defined target CINR (Carrier to Interference and Noise Ratio) in said one node.

54. The method according to claim 53, further comprising adjusting transmitter power in a node which is interfering with a plurality of other nodes in said cluster until said interference is reduced.

55. The method according to claim 54, wherein said step of adjusting includes:
measuring, in each node, interference caused by other nodes in said cluster and providing an output signal corresponding thereto;
polling, in said feeder, said plurality of nodes in a cluster to receive said output signals;
determining, in said feeder, from said received output signals, which node is causing interference to a plurality of other nodes in said cluster and providing an output signal corresponding thereto; and
instructing, by said feeder, said interfering node to reduce power from its transmitter.

56. The method according to claim 51, wherein said step of implementing includes implementing null steering of transmission beams.

57. The method according to claim 51, wherein said step of implementing includes encoding each concurrent transmission with a different CDMA (Code Division Multiple Access) code.

58. The method according to claim 57, wherein said step of encoding includes encoding using a code from a Walsh-Hadamard family of codes.

59. The method according to claim 51, wherein said step of implementing includes utilizing Orthogonal Frequency Division Multiple Access (OFDMA) for sub-channel management.

60. The method according to claim 59, wherein said step of utilizing OFDMA includes:
   allocating at least one time and frequency slot from an OFDMA time/frequency map to each concurrent transmission; and
   mapping each said transmission to its allocated slot.

61. The method according to claim 51, wherein said step of implementing includes implementing spatial beam coordination.

62. The method according to claim 51, wherein said step of implementing includes implementing fractional frequency re-use.

63. The method according to claim 62, wherein said step of implementing includes:
   dividing the cluster into at least two tiers of links, according to number of hops to the feeder;
   enabling concurrent communication over one third of an available frequency band on adjacent links in an outermost of said tiers during backhaul transmissions; and
   enabling communication on all of said available frequency band on links within all other said tiers during said backhaul transmissions.

64. The method according to claim 46, further comprising: creating sectorization of transmission from each said node for concurrent transmission in three directions over one third of available bandwidth during backhaul transmissions.

65. The method according to claim 64, comprising:
   forming said antenna arrangement of three directional antennas; and
   said step of creating sectorization includes mounting said antennas such that each antenna is aimed in a different direction.

66. The method according to claim 64, comprising:
   forming said antenna arrangement of a plurality of omni-directional antennas; and
   said step of creating sectorization includes implementing beam forming techniques to form several beams, each said beam comprising transmissions from a selected group of antennas directed to a selected sector.

67. The method according to claim 66, wherein said step of forming an antenna arrangement includes arranging six omni-directional antennas in a circle.

68. The method according to claim 66, wherein said step of forming an antenna arrangement includes arranging nine omni-directional antennas in a selected configuration.

69. The method according to claim 66, wherein said step of forming an antenna arrangement includes arranging twelve omni-directional antennas in a selected configuration.

70. The method according to claim 66, wherein said step of forming an antenna arrangement includes arranging six omni-directional antennas in two geographically separated triplets, for communication over three sectors of 120° each.

71. The method according to claim 70, wherein said step of forming an antenna arrangement includes arranging six omni-directional antennas in two sets of triplets, further comprising polarizing electromagnetic fields of said antennas, such that each stream has a different polarization, to enable concurrent communication of three MIMO (Multiple In/Multiple Out) streams.

72. The method according to claim 46, wherein said step of providing a wireless point to point backhaul network includes providing in-band backhaul, by including an access time slot and a backhaul time slot in each transmission frame.

73. The method according to claim 72, wherein said step of providing a wireless backhaul network includes providing a frame builder in each node, and causing said MAC controller to drive said frame builder to insert access bursts into each transmission frame for transmission during an access time slot, and backhaul data into each transmission frame for transmission during a backhaul time slot.

74. The method according to claim 73, wherein said step of causing said MAC controller to drive said frame builder includes driving said frame builder to fill each frame with transmission slots of access adjacent transmission periods of backhaul, and reception slots of access adjacent reception periods of backhaul.

75. The method according to claim 46, further comprising implementing, in said MAC controller, radio resources reuse, whereby geographically separated backhaul links in a cluster transmit over a same radio frequency range, at a same time, for concurrent backhaul transmissions on a single radio frequency channel.

76. The method according to claim 75, wherein said step of implementing radio resources re-use includes:
   geographically separating said backhaul links;
   providing directional beams from each node;
   receiving, in said feeder, interference measurements from said links; and
   centrally managing, in said feeder, the cluster in accordance with said interference measurements; and
   deploying said nodes below roof-top level.

77. The method according to claim 42, further comprising adaptively allocating 1, 2 or 3 MIMO (Multiple In/Multiple Out) streams to different antennas in said antenna arrangement for wireless backhaul point to point communication between nodes in a link.

78. The method according to claim 77, further comprising adaptively allocation modulation and coding in said backhaul communication.

79. The method according to claim 46, further comprising enabling one node, in backhaul, to communicate concurrently with multiple nodes in a single frequency band using SDMA (Space Division Multiple Access) wherein transmissions are separated by different, spatially separated beam allocations, created by geographic separation in deployment.

80. A mobile broadband wireless access point unit comprising:
   one RF (Radio Frequency) transceiver for transmitting and receiving both mobile broadband wireless access and mobile broadband wireless backhaul communications;
   a modem coupled to said transceiver;
   a plurality of antennas coupled to said modem; and
   one controller for controlling said RF transceiver, said modem and said antennas for both said wireless access and wireless backhaul communications.

81. The access point according to claim 80, further comprising:
   a housing adapted and configured to hold said transceiver, said modem and said controller;
   said antennas being mounted on said housing; and
   a system-on-chip mounted in said housing, said system-on-chip including said controller.

* * * * *